United States Patent
Zhang et al.

(10) Patent No.: US 11,824,726 B2
(45) Date of Patent: *Nov. 21, 2023

(54) SYSTEMS AND METHODS FOR COMMUNICATION NETWORK CUSTOMIZATION

(71) Applicant: HUAWEI TECHNOLOGIES CO., LTD., Shenzhen (CN)

(72) Inventors: Hang Zhang, Nepean (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

This patent is subject to a terminal disclaimer.

(21) Appl. No.: 17/559,221

(22) Filed: Dec. 22, 2021

(65) Prior Publication Data

US 2022/0116278 A1    Apr. 14, 2022

Related U.S. Application Data

(63) Continuation of application No. 16/839,823, filed on Apr. 3, 2020, now Pat. No. 11,252,042.

(Continued)

(51) Int. Cl.
  *H04L 41/12* (2022.01)
  *H04L 45/02* (2022.01)
  (Continued)

(52) U.S. Cl.
  CPC ............. *H04L 41/12* (2013.01); *H04L 5/006* (2013.01); *H04L 41/0895* (2022.05);
  (Continued)

(58) Field of Classification Search
  CPC ......... H04L 41/0895; H04L 41/12–122; H04L 41/34–40; H04L 41/5003–5025;
  (Continued)

(56) References Cited

U.S. PATENT DOCUMENTS 10,057,777 B2 *  8/2018  Li ......................... H04W 16/02
2007/0082616 A1   4/2007  Bird
(Continued)

FOREIGN PATENT DOCUMENTS

CN           104081719 A      10/2014

OTHER PUBLICATIONS

Huawei "Corrections for support of data forwarding for reestablishment UE" R3-191415; 3GPP TSG-RAN3 Meeting #103bis; Xi'an, China, Mar. 30, 2019 (Mar. 30, 2019), total 2 pages.

*Primary Examiner* — Brendan Y Higa

(57) ABSTRACT

Systems and methods are provided for identifying an available infrastructure network topology consisting of a set of available network links and a set of available network nodes of a communication network. In the systems and methods, a network node of the communication network is operative to transmit a learning schedule to a plurality of network nodes interconnected by a set of network links of the communication network. The network node receives from each of the plurality of network nodes a communication node record including network performance observations observed by that network node based on the learning schedule transmitted to that network node. Based on the received communication node records, the network node identifies a set of available network links from the set of network links and the set of available network nodes corresponding to the set of available network links.

20 Claims, 14 Drawing Sheets

Related U.S. Application Data

(60) Provisional application No. 62/833,365, filed on Apr. 12, 2019.

(51) Int. Cl.

| | | |
|---|---|---|
| *H04L 43/08* | (2022.01) | |
| *H04L 43/0811* | (2022.01) | |
| *H04L 41/122* | (2022.01) | |
| *H04L 43/20* | (2022.01) | |
| *H04L 41/0895* | (2022.01) | |
| *H04L 45/28* | (2022.01) | |
| *H04W 84/18* | (2009.01) | |
| *H04L 5/00* | (2006.01) | |
| *H04L 43/067* | (2022.01) | |

(52) U.S. Cl.
CPC .......... *H04L 41/122* (2022.05); *H04L 43/067* (2013.01); *H04L 43/08* (2013.01); *H04L 43/0811* (2013.01); *H04L 43/20* (2022.05); *H04L 45/02* (2013.01); *H04L 45/28* (2013.01); *H04W 84/18* (2013.01)

(58) Field of Classification Search
CPC ....... H04L 41/5051–5067; H04L 43/08–0805; H04L 43/20; H04W 28/0268; H04W 28/0967–0983; H04W 28/16–26
See application file for complete search history.

(56) References Cited

U.S. PATENT DOCUMENTS

| | | | |
|---|---|---|---|
| 2012/0233302 A1* | 9/2012 | Kallin | H04L 47/72 |
| | | | 709/221 |
| 2014/0140216 A1 | 5/2014 | Liu et al. | |
| 2015/0188620 A1* | 7/2015 | Ponnuswamy | H04B 7/10 |
| | | | 375/267 |
| 2017/0195456 A1 | 7/2017 | Ohlen et al. | |
| 2018/0184430 A1* | 6/2018 | Das | H04L 43/16 |
| 2018/0316564 A1* | 11/2018 | Senarath | H04L 41/5006 |
| 2018/0317133 A1* | 11/2018 | Sciancalepore | H04W 16/02 |
| 2018/0359337 A1* | 12/2018 | Kodaypak | H04L 41/0897 |
| 2019/0109638 A1 | 4/2019 | Yilmaz et al. | |
| 2020/0044943 A1* | 2/2020 | Bor-Yaliniz | H04L 43/16 |
| 2021/0075697 A1* | 3/2021 | Dattagupta | H04L 41/0886 |
| 2021/0153077 A1* | 5/2021 | Samdanis | H04W 48/18 |

\* cited by examiner

| Node/device ID | Time index (e.g., frame #) | Time index (e.g., frame #) | Time index (e.g., frame #) | Time index (e.g., frame #) | ...... |
|---|---|---|---|---|---|
| Tx | Uu link/side link ID: Tx power, Tx code, Tx beam | Uu link/side link ID: Tx power, Tx code, Tx beam | Uu link/side link ID: Tx power, Tx code, Tx beam | Uu link/side link ID: Tx power, Tx code, Tx beam | Uu link/side link ID: Tx power, Tx code, Tx beam |
| Rx | Uu link/side link ID: Rx code, Rx beam | Uu link/side link ID: Rx code, Rx beam | Uu link/side link ID: Rx code, Rx beam | Uu link/side link ID: Rx code, Rx beam | Uu link/side link ID: Rx code, Rx beam |

FIG. 3

SYSTEMS AND METHODS FOR COMMUNICATION NETWORK CUSTOMIZATION

CROSS REFERENCE TO RELATED APPLICATIONS

This application is a continuation of U.S. patent application Ser. No. 16/839,823 filed Apr. 3, 2020, entitled "Systems and Methods for Communication Network Customization" and claims priority of U.S. Provisional Patent Application Ser. No. 62/833,365, entitled "Systems and Methods for Communication Network Customization" filed Apr. 12, 2019, the contents of which are incorporated herein by reference.

FIELD OF THE INVENTION

The present invention generally pertains to the field of communication networks, and particular embodiments or aspects relate to customization of communication networks to meet service requirements.

BACKGROUND

Next generation communication networks are proposed to have a flexible architecture based on the virtualization of network functions that may be distributed and dynamically modified across the network hardware infrastructure. The concept of a network slice, a logical virtual network instantiated over a next generation network, allows for flexible provision of service and charging levels for individual customers or electronic devices accessing the network slice.

Vertical/industry customers will likely become separate customer entities for future communication networks, as opposed to the end user model currently employed by wireless network providers. These vertical/industry customers may include, for instance, factories, farms, smart cities, mobile hospitals, utility providers, mobile and stationary service providers, etc. The main characteristics of such customers may include some or all of the following attributes: common ownership for the connectivity of multiple electronic devices; common responsibility for the connectivity of multiple electronic devices; known service level communication requirements and network topologies; predictable traffic patterns; predictable mobile paths; desire and capability to deploy private infrastructure network(s) with or without the support of network operators/vendors/etc.

As an example, a utility service provider may provide each of its customers with a smart meter deployed at their home or business to track utility consumption, provide utility service metrics, or both. The smart meters may comprise electronic devices that include communication functionality to connect to a communication network (wired or wirelessly) to automatically feed back utility information to the utility provider that may include utility consumption metrics, utility service metrics, or both. In some cases, the utility service provider may further include mobile electronic devices that exchange utility information with utility provider fixed infrastructure. It would be useful for the utility service provider to have a virtual network established on an operator's network that flexibly, efficiently, and economically supports the communication needs of the utility provider.

In general, there is a need for a communication network customization that provides for a network that may be automatically deployed, automatically operated, automatically maintained, or a combination thereof.

Accordingly, there may be a need for systems and methods for customization of communication networks to meet service requirements that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

In embodiments, systems and methods are provided for customizing a virtual network that include learning available infrastructure network topology and determining an available infrastructure network, and designing one or more service-based slice/virtual networks for each types of service to be supported. The embodiments may include, for instance, designing and configuring the infrastructure network topology and Transmission (Tx)/Receiving (Rx) scheduling requirements of each communication party requiring access to the service (network nodes, electronic devices (fixed and/or mobile) onto the infrastructure network nodes and electronic devices. In some embodiments, the customizing may be performed once and then the virtual network is operated as a fixed customized network. In some embodiments, the customizing may be performed dynamically and then the virtual network is operated as a dynamically customized network that allocates and modifies resources during operation to match network performance to current service requirements for that virtual network. The systems and methods provide for a solution that increase flexibility of on-demand deployment of a virtual network on an existing infrastructure network to support changing customer requirements, or predictably varying customer requirements.

In an embodiment a method is provided for identifying an available infrastructure network topology consisting of a set of available network links and a set of available network nodes of a communication network. The method may be performed by a network node (e.g. an infrastructure network learning controller) of the communication network. The method includes transmitting a learning schedule to a plurality of network nodes interconnected by a set of network links of the communication network. The method includes receiving from each of the plurality of network nodes a communication node record including network performance observations observed by that network node based on the learning schedule transmitted to that network node. The method includes identifying (e.g. providing an identification of) a set of available network links from the set of network links based on the received communication node records, and identifying the set of available network nodes corresponding to the set of available network links. The learning schedule may direct the plurality of network nodes to perform specified communication operations and record network performance operations based on the communication operations.

In some aspects, the learning schedule further includes an update schedule for each of the plurality of network nodes to transmit communication node records to the communication node, and the method may further include receiving, from each of the plurality of network nodes, the communication record for that network node according to the corresponding update schedule.

In some aspects, the method may further include the network node or another network node, such as a slice customization controller: determining a customized network slice topology based on a service level topology and the available infrastructure network topology. The service level topology may be defined by a customer. The service level topology may define a subset of the plurality of network nodes and communication requirements therebetween, the customized network slice topology specifying network nodes and interconnections from the available infrastructure network topology which are adequate for delivering a service according to the service level topology.

In some aspects, the method may further include the network node or another network node, such as an infrastructure network customization manager: configuring the set of available network nodes based on the determined customized network slice topology. The configuring may be performed prior to deployment of the service and is typically restricted to configuring a subset of the nodes. The configuring may include directing the subset of the nodes to communicate according to a fixed resource allocation, which includes a fixed communication schedule which is communicated to the nodes and thereafter used by the nodes, typically for multiple communications.

Additionally, the network node may include one or more means or units for carrying out the steps of the methods in the embodiments of this present invention. For example, the steps include receiving from each of the plurality of network nodes at least one further communication node record including network performance observations observed by that network node after the set of available network nodes has been configured; and, evaluating the set of network links based on the at least one further communication record. In some aspects, the at least one further communication node record is received based the learning schedule. In some aspects, the at least one further communication node record is received based on a request previously transmitted by the network node to the set of network nodes. In some aspects, the network node may further carry out the step of: changing at least one of the set of available network links or the determined network slice topology based on the at least one further communication record.

In some embodiments, a network function or device, such as an infrastructure network learning controller (operative for example on a network node) is provided. The network function or device includes a network interface for receiving data from and transmitting data to network functions connected to a communication network; a processor; and a non-transient memory for storing instructions. The instructions, when executed by the processor, cause the network function to be configured to identify an available infrastructure network topology consisting of a set of available network links and a set of available network nodes of the communication network. The network function or device is operative to: transmit a learning schedule to a plurality of network nodes interconnected by a set of network links of the communication network; receive from each of the plurality of network nodes a communication node record including network performance observations observed by that network node based on the learning schedule transmitted to that network node; and identify a set of available network links from the set of network links based on the received communication node records, and identifying the set of available network nodes corresponding to the set of available network links. The learning schedule may direct the plurality of network nodes to perform specified communication operations and record network performance observations based on said communication operations.

In some aspects, the learning schedule further includes an update schedule for each of the plurality of network nodes to transmit communication node records to the communication node, and wherein the network node is further operative to: receive, from each of the plurality of network nodes, the communication record for that network node according to the corresponding update schedule.

In some aspects, the network function or device, or another associated network function or device such as a slice customization controller, is further operative to: determine a customized network slice topology based on a service level topology and the available infrastructure network topology.

In some aspects, the network function or device, or another associated network function or device such as an infrastructure network customization manager, is further operative to: configure the set of available network nodes based on the determined network slice topology. In some aspects, the network function is further operative to: receive from each of the plurality of network nodes at least one further communication node record including network performance observations observed by that network node after the set of available network nodes has been configured; and, evaluate the set of network links based on the at least one further communication record. The at least one further communication node record may be received based on a request previously transmitted by the network node to the set of network nodes. The at least one further communication node record may be received based on the learning schedule.

In some aspects, the network function may further be operative to change at least one of the set of available network links or the determined network slice topology based on the at least one further communication record.

In some aspects, the set of available network links is identified by evaluating (e.g. by the network function) communication node records corresponding to each network link based on a pre-determined performance requirement set for that network link.

In some aspects, pre-determined performance requirement comprises a signal-to-noise ratio (SNR) threshold for that network link.

According to an embodiment, there is provided a method for defining a customized network slice topology to be established using a plurality of network nodes interconnected by a set of network links of a communication network. The method may be performed by a slice customization controller of the communication network, or associated network function. The method includes receiving a customer-defined service level topology defining a subset of the plurality of network nodes and communication requirements therebetween. The method includes receiving an indication of an available infrastructure network topology consisting of a set of available network nodes and a set of available network links interconnecting the set of available network nodes, the available infrastructure network topology identified based on observations, by the plurality of network nodes, of network operations in comparison with specified network performance criteria. The method includes transmitting an indication of the customized network slice topology determined based on the customer-defined service level topology and the available infrastructure network topology, the customized network slice topology specifying network nodes and interconnections from the available infrastructure network topology which are adequate for delivering a service according to the service level topology.

According to an embodiment, there is provided a method for configuring a communication network to deliver a service. The communication network includes a plurality of network nodes interconnected by a set of network links of the communication network. The method may be performed by an infrastructure network customization manager of the communication network, or associated network function. The method includes receiving an indication of an available infrastructure network topology consisting of a set of available network nodes and a set of available network links interconnecting the set of available network nodes, the available infrastructure network topology identified based on observations, by the plurality of network nodes, of network operations in comparison with specified network performance criteria. The method includes receiving a customized network slice topology specifying network nodes and interconnections from the available infrastructure network topology which are adequate for delivering the service. The method includes, prior to deployment of the service, transmitting instructions to a subset of nodes belonging to the set of available network nodes, the instructions configuring said subset of nodes to communicate according to a fixed resource allocation including a fixed communication schedule. The subset of nodes and the fixed resource allocation are set so that they are adequate to deliver the service according to the customized network slice topology.

According to an embodiment, there is provided an infrastructure network learning controller comprising: a network interface for receiving data from and transmitting data to network functions connected to a communication network; a processor; and a non-transient memory for storing instructions. The instructions, when executed by the processor, cause the infrastructure network learning controller to be configured to identify an available infrastructure network topology consisting of a set of available network links and a set of available network nodes of the communication network. The infrastructure network learning controller is operative to transmit a learning schedule to a plurality of network nodes interconnected by a set of network links of the communication network, the learning schedule directing the plurality of network nodes to perform specified communication operations and record network performance observations based on said communication operations. The controller is further operative to receive, from each node of the plurality of network nodes, a respective communication node record including the network performance observations observed by said node based on the learning schedule transmitted to said node. The controller is further operative to provide an identification of the set of available network links from the set of network links based on the received communication node records. The controller is further operative to provide an identification of the set of available network nodes corresponding to the set of available network links.

According to an embodiment, there is provided a slice customization controller comprising: a network interface for receiving data from and transmitting data to network functions connected to a communication network; a processor; and a non-transient memory for storing instructions. The instructions, when executed by the processor, cause the slice customization controller to be configured to define a customized network slice topology to be established using a plurality of network nodes interconnected by a set of network links of a communication network. The slice customization controller is operative to receive a customer-defined service level topology defining a subset of the plurality of network nodes and communication requirements therebetween. The controller is further operative to receive an indication of an available infrastructure network topology. The topology includes a set of available network nodes and a set of available network links interconnecting the set of available network nodes. The available infrastructure network topology is identified based on observations, by the plurality of network nodes, of network operations in comparison with specified network performance criteria. The controller is further operative to transmit an indication of the customized network slice topology determined based on the customer-defined service level topology and the available infrastructure network topology, the customized network slice topology specifying network nodes and interconnections from the available infrastructure network topology which are adequate for delivering a service according to the service level topology.

According to an embodiment, there is provided an infrastructure customization manager comprising: a network interface for receiving data from and transmitting data to network functions connected to a communication network; a processor; and a non-transient memory for storing instructions. The instructions, when executed by the processor, cause the infrastructure customization manager to be configured to configure a communication network to deliver a service. The communication network includes a plurality of network nodes interconnected by a set of network links of the communication network. The infrastructure customization manager is operative to: receive an indication of an available infrastructure network topology consisting of a set of available network nodes and a set of available network links interconnecting the set of available network nodes. The available infrastructure network topology is identified based on observations, by the plurality of network nodes, of network operations in comparison with specified network performance criteria. The manager is operative to receive a customized network slice topology specifying network nodes and interconnections from the available infrastructure network topology which are adequate for delivering the service. The manager is operative, prior to deployment of the service, to transmit instructions to a subset of nodes belonging to the set of available network nodes. The instructions configure the subset of nodes to communicate according to a fixed resource allocation including a fixed communication schedule. The subset of nodes and the fixed resource allocation are adequate to deliver the service according to the customized network slice topology.

It is noted that, in some embodiments, multiple network nodes, functions or devices may operate together in a system which is provided according to embodiments of the present invention. For example, a system may be provided which includes two or more of: an infrastructure network learning controller, a slice customization function, and an infrastructure network customization manager.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 3 illustrates an available infrastructure network topology learning schedule and an observation reporting schedule, for customizing a communication network according to embodiments of the present invention;

DETAILED DESCRIPTION

In embodiments, the systems and methods provide for a solution that takes advantage of characteristics of predictability in communication network use and requirements to simplify operation of a network. In embodiments, the systems and methods provide for a solution that takes advantage of flexibility of on-demand deployment of a virtual network on an existing infrastructure network to support changing customer requirements, or predictably varying customer requirements. In embodiments, the systems and methods provide for a solution that integrates conventional control and management planes functions of a virtual network to simplify the operation and management of the virtual network.

Figure 1:
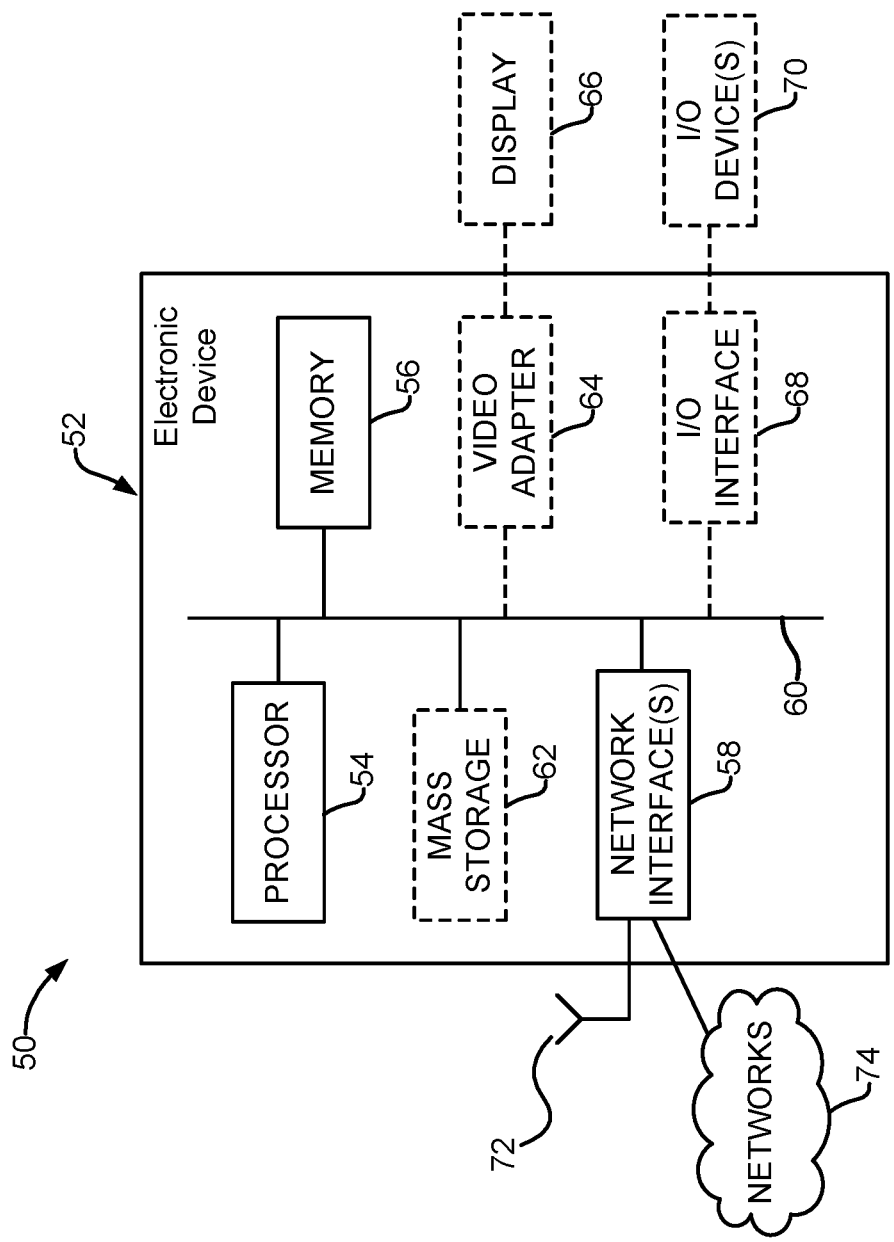
FIG. 1 is a block diagram of an electronic device 52 within a computing and communications environment 50 that may be used for implementing devices and methods in accordance with representative embodiments of the present invention.

FIG. 1 is a block diagram of an electronic device (ED) 52 illustrated within a computing and communications environment 50 that may be used for implementing the devices and methods disclosed herein. The electronic device can be configured by programming same to implement various functions and operations as discussed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is network infrastructure, the radio access network interface 72 may be omitted for nodes or functions acting as elements of the Core Network (CN) other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

In embodiments, systems and methods are provided for customizing a virtual network that include: 1) Learning available infrastructure network topology and determining an available infrastructure network; and, 2) Designing one or more service-based slice/virtual networks for each types of service to be supported. The embodiments may include, for instance, designing and configuring the infrastructure network topology and Transmission (Tx)/Receiving (Rx) scheduling requirements of each communication party requiring access to the service (network nodes, electronic devices (fixed and/or mobile) onto the infrastructure network nodes and electronic devices. In some embodiments, the customizing may be performed once and then the virtual network is operated as a fixed customized network. In some embodiments, the customizing may be performed dynamically and then the virtual network is operated as a dynamically customized network that allocates and modifies resources during operation to match network performance to current service requirements for that virtual network. Learning may pertain to automatically obtaining information about a subject (e.g. available infrastructure network topology) and processing the obtained information into further information indicative of the subject. Designing may pertain to automatically generating output indicative of an object (e.g. a network slice or virtual network), the output usable to configure network resources to provide the object.

In some embodiments, the systems and methods enable optimized network deployment, operation and maintenance of networks, and enables full automation of deployment, operation, and maintenance of virtual networks on an underlying infrastructure network topology.

Figure 2:
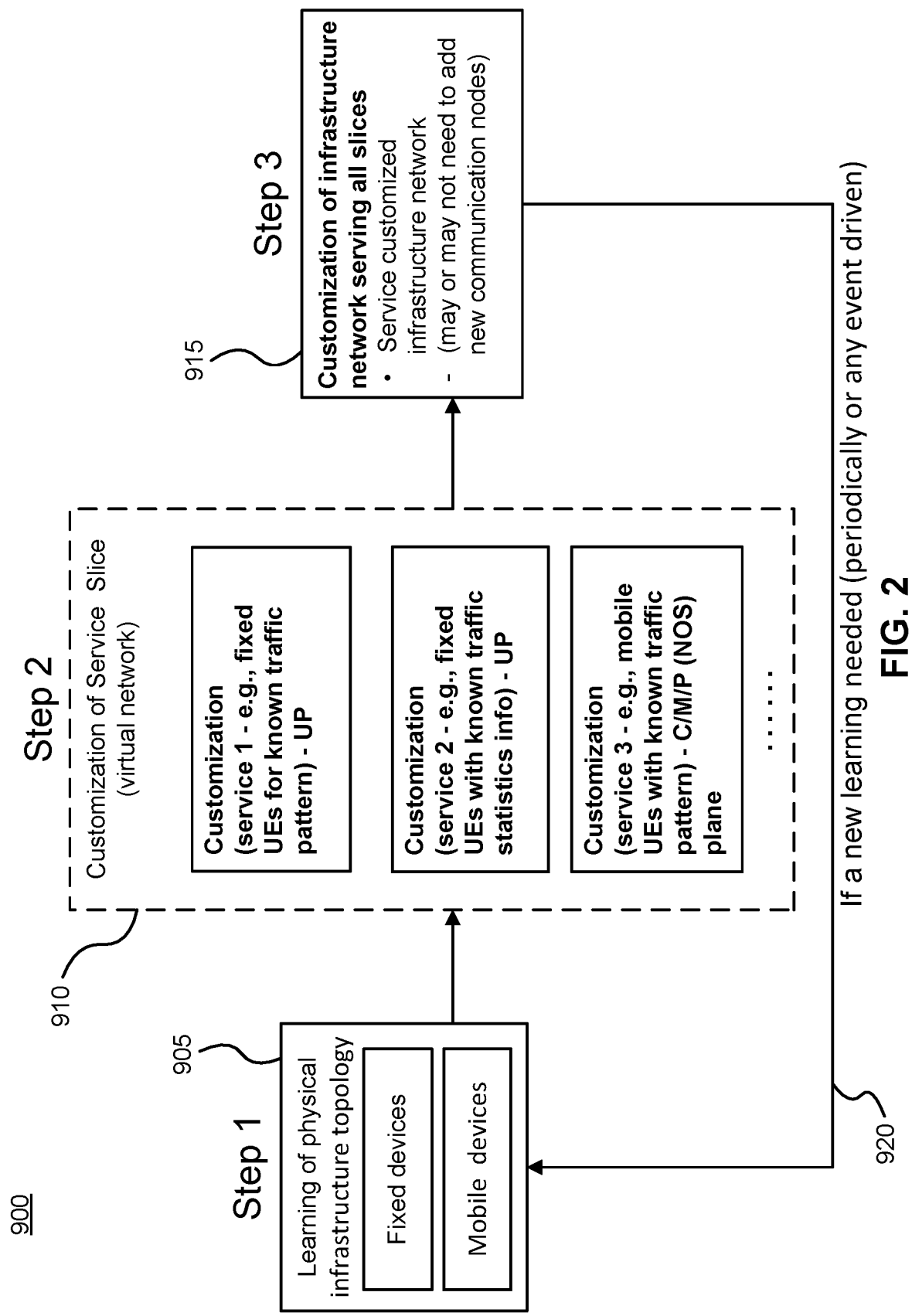
FIG. 2, is a flow chart illustrating an embodiment of a method for customizing a communication network.

FIG. 2 is a flow chart illustrating an embodiment of a customizing method 900 for customizing a communication network. Available input for the customizing method 900 may include, for instance, available input parameters such as: layout of communication components (physical layout MAP which includes (initial) gNB/AP sites, i.e., locations of network nodes, factory devices with communication modules, or moving path of mobile devices, etc.); characteristics of available communication components; communication/service level topology (service level communication topology); and service traffic patterns (if available) for the requested service.

In learning step 905, the available physical infrastructure network topology is evaluated. The available infrastructure network topology may include defined network nodes that are pre-defined or specified, network detected nodes which may be dynamically detected by a network function, or a combination thereof. The network nodes may include, for instance, fixed devices, such as network servers, network EDs, radio access nodes, fixed access nodes, and stationary EDs, as well as mobile devices which may provide network support or are end use devices seeking access to the communication network. The evaluation of available infrastructure network topology may involve learning through observing and recording wireless communication operations, as will be explained elsewhere herein.

In slice customization step 910, a service slice (e.g. a virtual network) may be defined for one or more required services based on a service-level communication/service topology in combination with Quality of Service (QoS)/Quality of Experience (QoE) requirements, known or predicted traffic patterns, etc. In general, the slice customization step 910 involves defining service requirements for the slice and defining user plane parameters required to achieve the defined service requirements. This can be performed using a slice customization function. In the example of FIG. 2, three separate services have been customized. Service 1 supports fixed EDs (e.g. fixed UEs) with known traffic patterns by defining user plane parameters for Service 1. An example of Service 1 would be for fixed utility meters that are able to communicate at scheduled times, such as off hours, to minimize cost while maintaining connectivity on a regulated schedule. Service 2 supports fixed EDs with known traffic statistics patterns by defining user plane parameters for Service 2. An example of Service 2 would be for a business customer that had predictable but non-scheduled connectivity requirements. The predictable requirements may be generally consistent so as to allow for statistical analysis and prediction of data traffic and connectivity requirements. Service 3 supports mobile EDs with known traffic patterns, such as a postal service with mobile delivery units. The mobile units may require connectivity during each shift which while servicing their pre-determined delivery routes. Other examples may include mobile units with known traffic statistics information, fixed units with unknown traffic information and mobile units which, while individually having an unknown traffic pattern within a geographic region, may in aggregate have either a known or statistically predicted traffic pattern within a defined region.

In infrastructure customization step 915, a slice-aware/service-customized infrastructure network topology is defined based on a service-customized slice as defined in step 910 and based on an available infrastructure network topology learned in step 905. This operation can be performed by an infrastructure network customization function.

In optional monitoring step 920, the defined network may be optimized by returning to step 905 and learning a current physical infrastructure network topology and repeating steps 905, 910, and 915 to maintain an optimized virtual network.

In various embodiments, this solution is a further extension of a MyNET solution. The MyNET solution provides an example of a system and method for the entire network architecture and creation/adaptation of service customized slice (virtual network). The additional functionalities required for the proposed customizing method 900 may include, for instance: Infrastructure network learning controller; Infrastructure network learning controller to control the learning procedure 905, for instance through SONAC-COM (MyNET function) which supports some or all of customization of slices/virtual network, a QoS for each device link, such as, D-D link, Uu link could be defined, and the multi-link transmission for reliability for each Uu and side-link of each device; Customization of the infrastructure network—MyNET, an InfM function with extended capability for defining of physical operation parameters; CM (MyNET CM function) providing for mobile UE connection management and aMAP management; CSM (customer service management) (MyNET CSM function) providing slice access control (AAA), performance assurance of a virtual (slice) performance, including the ability to detect/receive statistics of SL/Uu link failure rate and other relevant information; and, DAM (data log and analysis) (MyNET DAM function) that may provide data log and analytics to other functionalities. SONAC refers to Service-Oriented Network Auto Creation function, which may have network slice composition (SONAC-COM) and network slice operation (SONAC-OP) components. MyNET is described in detail in the paper "Future Wireless Network: MyNET Platform and End-to-End Network Slicing," by H. Zhang, submitted November 2016 and available at arxiv.org. D-D link refers to a link between devices. Uu link refers to a communication link between a mobile device and the network. The side-link (also referred to as "SL") is a direct peer-to-peer or device-to-device link for example between in-vehicle communication systems. The term "aMAP" refers to an access map for providing geographic details of radio access.

In more detail, an infrastructure network learning controller may control the learning procedure. An infrastructure management (InfM) function may be used to customize the infrastructure network. A connection management (CM) function may provide for mobile UE connection management. An Authorization, Authentication and Accounting (AAA) function may provide access control functionality. A data analytics management (DAM) function may perform data logging and data analytics, to support other functions.

In an embodiment, a method is provided for identifying an available infrastructure network topology based on the plurality of network nodes and network links of a communication network. The available infrastructure network topology consists of a set of available network links and a set of available network nodes of the communication network which are to be determined by a learning function operative on at least one of the network nodes of the communication network. In such embodiments, the network node transmits a learning schedule to a plurality of network nodes interconnected by a set of network links of the communication network. The learning schedule directs each of the plurality of network nodes to perform network performance observations as observed by that network node. The plurality of network nodes each perform the network performance observations directed by the learning schedule and transmit back to the learning function a communication node record indicative of the network performance observations observed by that network node. The learning function evaluates the communication node records to identify available network links from the set of network links that meet a pre-determined performance requirement (such as a SNR threshold for that network link). The available network links further identifies a set of available network nodes that correspond to the set of available network links.

The network performance observations can include data derived based on reception of test messages or other messages communicated to a node. For example, the network performance observations can include whether a message was received, that the signal strength, error rate, etc. was for the message, other physical characteristics of the message, etc. The network performance observations can indicate signal reliability, tolerance to interference, levels of interference, etc.

In more detail, the performance requirement for a link indicates what level of performance of a communication link is required for satisfying specific purposes of a specific node or set of nodes served by that link. The link can serve nodes directly coupled to the link as well as nodes which communicate via multiple links including the link. The performance requirement can include that the link supports a given data rate, a given SNR, a given reliability, a given set of modulation and coding schemes, a given set of frequencies, etc., or a combination thereof.

Referring to FIG. 3, in an embodiment for fixed EDs, the 5G-defined network entry procedure and system information may be used to broadcast an "available infrastructure network topology learning schedule" 1000, and an "observation reporting schedule". The observation reporting schedule indicates when communication nodes/devices are to report observed communication node records.

The learning schedule 1000 includes an identifier 1002 of the nodes or devices to which the schedule pertains, as well as entries 1004 for a plurality of time indexes 1006. The time indexes can be identified by frame number, for example. For each entry, transmission activities 1008 to be monitored and reception activities 1010 to be monitored at the corresponding time index are identified. Monitoring activities may comprise logging particular parameters for those activities. Transmission activity parameters may include the UU link or side link ID used, the transmission power used, the transmit code or encoding type used, and the transmission beam or beam type used. Reception activity parameters may include the UU link or side link ID used, the code or encoding type used at the receiver, and the beam or beam type used at the receiver.

The logged activity parameters may be reported to the infrastructure network learning function. The infrastructure network learning function may process this information to determine links, and characteristics thereof (e.g. SNR or QoS parameters, best channels, modulation and coding schemes, or beamforming schemes, or a combination thereof), in the available infrastructure network topology.

Figure 4:
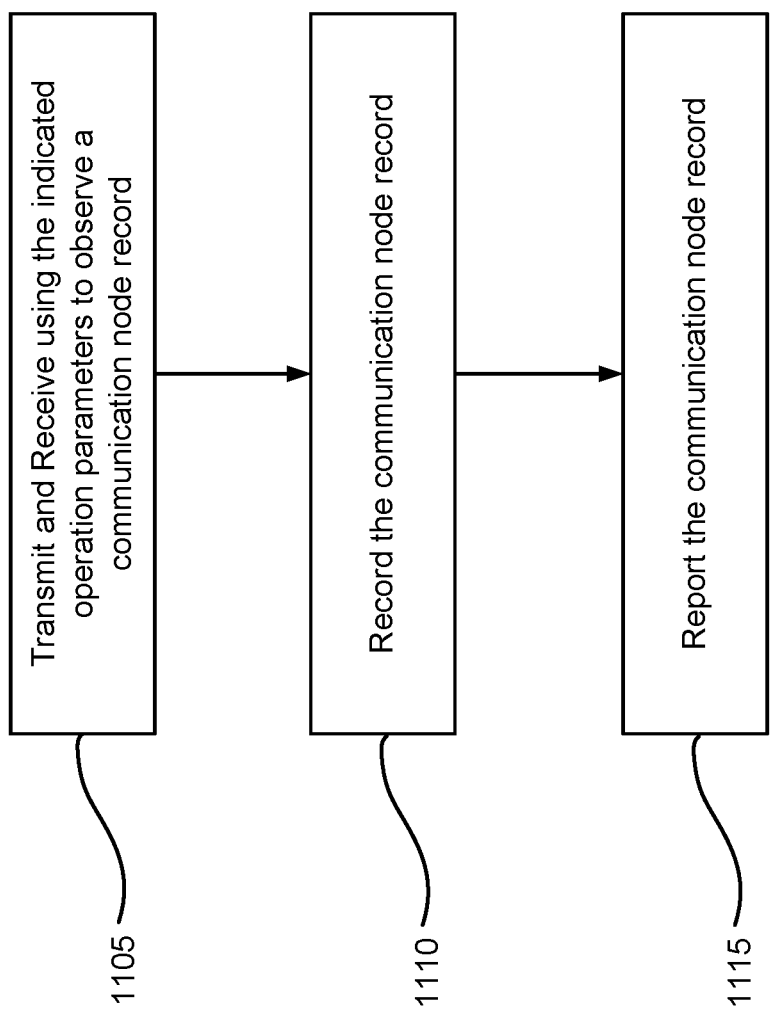
FIG. 4 illustrates a method for reporting a communication node record indicative of the available communication elements contactable by that network node, according to embodiments of the present invention.

In an embodiment illustrated in FIG. 4, a set of communication nodes/devices of a communication network may each perform a method for reporting a communication node record indicative of the available communication elements contactable by that network node. In step 1105, based on the learning schedule, the communication nodes/devices perform the operation of transmission and receiving, using the indicated operation parameters to observe a communication node record. The communication node record may include, for instance, a number of Tx repeating, code, power level(s), beams, Tx strength, Rx strength, etc. The communication record may include details of communication operations performed by the communication nodes/devices, such as what transmission power, code rate, number of transmission repeats, transmit or receive beam configuration, etc. was used by a particular node at a particular time. Observing the communication node record may correspond to observing the details of communication operations carried out by a node or device.

Based on the observed communication node record, in step 1110 the nodes/devices record the communication record including, for instance, Record i: Time (frame #), beam index, SNR, time offset relative to a reference, etc. and any other relevant parameters. The communication record may be recorded in memory and stored at least until reported.

Based on the reporting schedule, in step 1115 the communication nodes/devices each perform a reporting operation to report the observed communication record in the form of an observation report message that may include, for instance, a communication node/device ID and a list of records observed by that node/device. The node/device may transmit the observation report message to a network learning controller available on the network using an 'observation reporting schedule' defined resource. Multiple records may be sent together in the same report message. The observation reporting schedule may specify when the reports are to be sent and other details such as what node the reports are to be sent to and what information the reports are to include.

Figure 5:
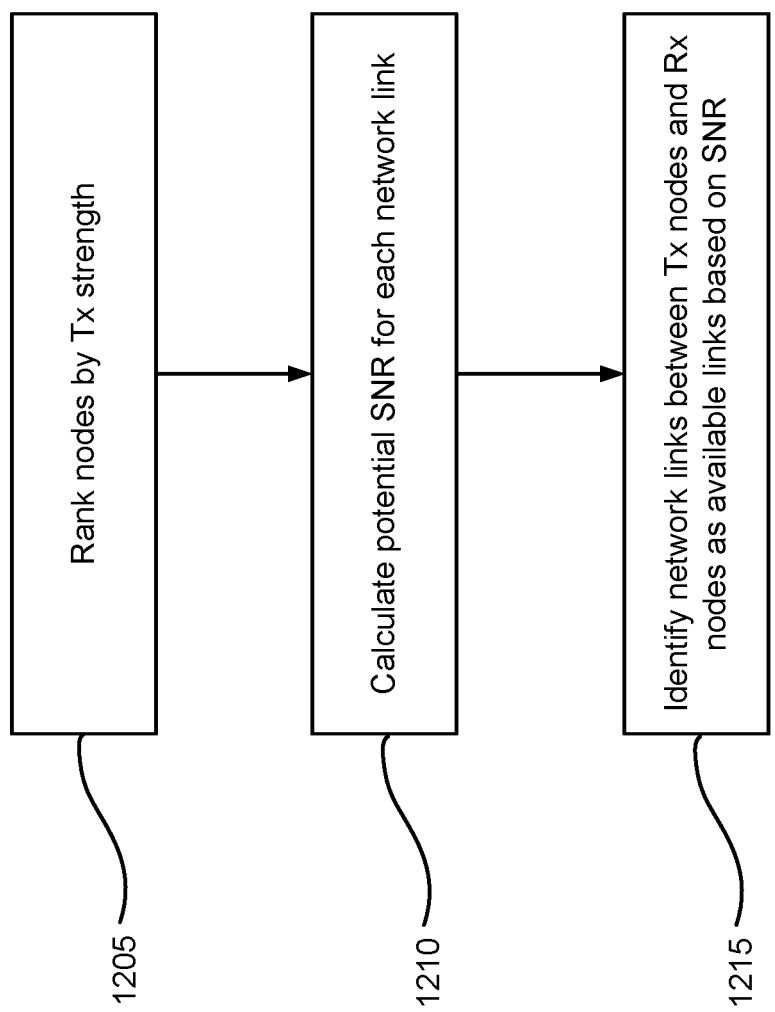
FIG. 5 illustrates a method for learning an available infrastructure network topology based on pre-configured acceptable signal-to-noise ratio (SNR) criteria and the received communication node records for each reporting node, according to embodiments of the present invention.

In an embodiment illustrated in FIG. 5, a network learning controller may perform a method for learning an available infrastructure network topology based on pre-configured acceptable signal-to-noise ratio (SNR) criteria and the received communication node records for each reporting node. The learning method may enable a customized infrastructure network operative to optimize the interference management and maximize the resource utilization and minimize the cost of infrastructure network development. Learning the available infrastructure network topology based on SNR criteria may involve determining, based on communication node records or other reported information, what links are present in the available infrastructure network topology which satisfy a predetermined SNR requirement. For example, if all links require at least an SNR level greater than a first threshold, the available infrastructure network will be determined such that it only includes links exhibiting an SNR above this first threshold. SNR requirements can additionally or alternatively be specified on a link-by-link basis.

According to various embodiments, learning of the available infrastructure network topology is performed on an ongoing basis, or periodically, or in response to an automatic or manual trigger. In various embodiments, the available infrastructure network topology is determined based on a plurality of observations taken over a range of times. Statistical processing can be performed on the plurality of observations. The statistical processing can provide statistically generated indications of network conditions such as link SNR values. The statistical processing can be performed so as to filter out random and short (e.g. instant) fast fading events on available links. This mitigates the probability that the available infrastructure network topology could be determined based on intermittent fading events that do not accurately reflect long-term network conditions.

In some embodiments, the plurality of observations taken over the range of times can be input into an adaptive filter. The adaptive filter may be configured to filter out random and instant fast fading events. The adaptive filter may further be configured to provide indications of network conditions (e.g. link SNR values) such that the adaptive filter is responsive, with adequate speed, to long-term changes in network conditions and also such that the adaptive filter is robust to short-term events such as fast fading events. In some embodiments, other smoothing or averaging mechanisms can be used to filter out intermittent events such as fast fading events. For example, a moving average can be taken of observations such as link SNR observations over a period of time, and the moving average can be output as the observation upon which a determination of the available infrastructure network topology is made.

An available infrastructure network topology includes a set of network links each connecting at least one pair of transmitting (Tx) and receiving (Rx) nodes. The following network link information may be used to describe each network link: link ID; sending node/device ID, Tx parameters during learning phase; Receiving node/device ID, Rx parameter used during learning phase; SNR; and a Timing offset. The Tx parameters may be parameters used during the learning phase.

In step 1205 the network learning controller identifies, ranks, or sorts the reporting nodes based on Tx strength. In step 1210 the network learning controller calculates a potential link SNR for a corresponding network link between each Rx node relative to a corresponding Tx node for that link, with or without interference of other nodes as may be preferred. In step 1215, if the calculated potential SNR is higher than a pre-determined threshold SNR, then the link between the Tx node and the receiving node is marked as an available link for the available infrastructure network topology. After completing the learning method for all communication nodes, and corresponding network links, the available infrastructure network topology may be determined as a collection of all available links that meet the pre-determined SNR threshold. The learning method may be performed as part of an initial learning procedure to establish the available infrastructure network topology. In some embodiments, the learning method may be performed periodically to update the available infrastructure network topology according to an update schedule. In some embodiments, the learning method may be performed on-demand to update the available infrastructure network topology as needed based on current requirements, QoS/QoE measurements for the corresponding network slice, or other network management requirements.

In embodiments where mobile nodes/devices are a part of the network, additional positional information may be required. In these embodiments, control and learning for fixed nodes is performed as described above. A mobile learning schedule may be provided for testing mobile nodes. The learning schedule may include, for instance, positioning information, timing information, and signal strength information.

In an embodiment where GPS or 3GPP positioning information is available, the mobile learning schedule for a mobile node may include a received Tx/Rx schedule which may include Tx information such as a location index, time, power, beam, code, etc., and Rx information such as location index, time, beam, code, etc.

In an embodiment where GPS or 3GPP positioning information is not available, the mobile learning schedule for a mobile node may include a received Tx/Rx schedule which may include Tx information such as time, power, beam, code, etc., and Rx information such as time, beam, code, etc.

The learning at a mobile node that is being tested may include, Tx/Rx based on schedule; a mobile node observation record that may include a location index, time, code, SNR/signalling strength, time offset, etc.; and, observation record reporting that may include, for instance, a list including all mobile node observation records for that node, transmitted to the learning controller using network resources defined in an 'observation reporting schedule.'

The learning controller is operative to receive the observation records provided by the mobile nodes, and with DAM support, determine a potential network link SNR for each location and time. The learning controller may then use the method of FIG. 5 to determine which communication nodes will support mobile connectivity.

The available network links for mobile nodes may be included in the definition of an available infrastructure network topology. In some embodiments mobile link ID's may include, for instance, a link ID; a sending node/device or location (e.g., cubic ID) and Tx parameters used during learning phase; a receiving node/device or location(e.g., cubic ID) and Rx parameters used during learning phase; SNR; and, a timing offset.

In an embodiment, network slices (virtual networks) may be customized based on the service level topology and service description, provided by a network customer, such as a utility provider, business, government, etc. A defined customized network slice may include: Virtual function(s) in available network nodes and devices and a logical topology among these nodes and devices and other virtual network functions; Physical links (capacity requirement, latency requirement) for each logical link where available (e.g., for fixed devices, the side link and Uu link); Transmission type—Broadcast/multicast/unicast type; L2/3 protocols for each of these logical links and physical links.

In embodiments an infrastructure network topology may be customized. For instance, for MyNET design a network slice is first created based on a slice definition. The slice definition includes infrastructure network resource allocation for the network slice, i.e., a group of devices. This may be performed by SONAC-COM. During the operation of such a slice, the slice resources need to be further real-time allocated to each of the devices, on an on-demand basis. This may be performed by SONAC-Op. Given the characteristics of vertical services, i.e., known or plannable traffic patterns and or known or plannable devices mobility pattern, the slice resource allocation can be pre-defined/configured, and the Tx/Rx/power-off of each node/device (fixed or mobile) can be optimally designed to minimize interference.

For services with predictable traffic patterns and fixed devices, the infrastructure network customization manager, based on the available infrastructure network topology from Learning controller and slice design from SONAC-COM, determines, for each communication node/device a fixed infrastructure resource allocation that includes a Tx time schedule table and a Rx time schedule table. The manager of customization of infrastructure network (infrastructure network customization manager) can be an infrastructure network customization function.

The Tx time schedule table may include, for each of the Tx opportunities in Un and SL: broadcast/multicast/unicast; and, for each time opportunity (e.g., frame number(s), etc.): Carrier(s)/frequency(s); Beam index(es); DM-RS/Code(s); Tx power; MCS; Time advance; etc. DM-RS refers to a demodulation reference signal.

The Rx time schedule table may include, for each time opportunity (e.g., frame number(s), etc.) (in Uu or SL): Carrier(s)/frequency(s); Beam index(es); DM-RS/Code(s); MCS; etc. MCS refers to modulation and coding scheme.

For services with unpredictable traffic pattern, unpredictable mobile pathing of devices, or both, the manager of infrastructure network customization, based on the available infrastructure network topology determined by the learning controller and slice design from SONAC-Com, determines, for each fixed communication node/device and each of its links (Un/SL), Tx resource allocation windows (a set of basic physical layer resources, over time), and a Rx time schedule table.

For each Tx window the manager determines whether a Tx request is needed or not. If needed, the manager sends a request for each Tx of traffic. For each time opportunity (e.g., frame number(s), etc.), some or all of the following could be included: Carrier(s)/frequency(s); Beam index(es); DM-RS/Code(s); Tx power; MCS; Time advance; etc.

The Rx time schedule table may include, for each time opportunity (e.g., frame number(s), etc.) in Uu/SL, some or all of the following: Carrier(s)/frequency(s); Beam index (es); DM-RS/Code(s); MCS; etc.

The manager of infrastructure network customization further determines, for each of the mobile devices, location-based resource assignments if a MAP is available. In this situation a Tx/Rx schedule table may include a Tx (Uu/SL) for each location index and a Rx (Uu/SL) for each location index.

The Tx (Uu/SL) may include, for each location index: Time window; Power; Carrier/frequency; DM-RS/Codes; Beam index (antenna configuration); etc.

The Rx (Uu/SL) may include, for each location index: Time window; Carrier/frequency; DM-RS/Codes; Beam index (antenna configuration); etc.

If traffic patterns and mobility pathing are not available or predictable, the corresponding network slice definition may include a set/block of resources (e.g., a set of basic physical layer resource units) in Uu and SL for at least some of the nodes/devices. A real-time scheduler function may be implemented in the corresponding nodes/devices to allow for real-time resource scheduling.

In an embodiment a service-customized Network Operation Supporting Services (NOS) plane may be provided. In these embodiments, to enable customization of the infrastructure network topology the NOS functions need to be able to communicate with the devices/nodes of the available infrastructure network topology. In order to communicate, infrastructure resources need to be defined and allocated. In order to design such a NOS slice, the service level topology of that slice needs to be defined.

Figure 6A:
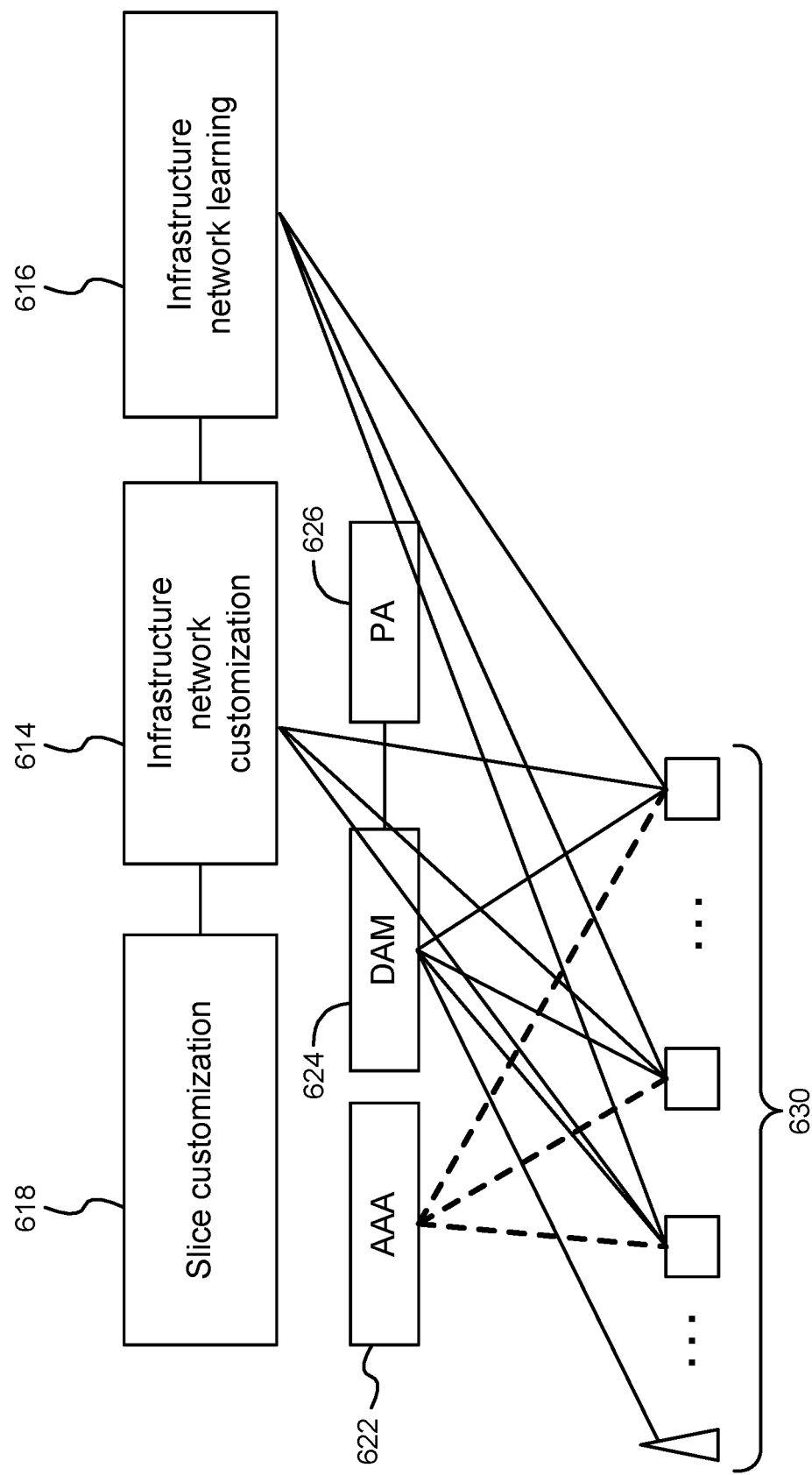
FIG. 6A illustrates a use case example embodiment of the present invention, assuming fixed nodes/devices and deterministic traffic.

Referring to FIG. 6A, in a first use case example assuming fixed nodes/devices and a deterministic (scheduled or predictable) traffic pattern(s) and transmission time(s). In this case network links can be relatively static and a dynamic link scheduler may be conveniently omitted. The NOS functions for the fixed and deterministic case may include: an infrastructure network learning controller 616; SONAC-COM; customization of infrastructure network; CSM (AAA 622, performance assurance 626); and DAM 624. The customization of the infrastructure network can be performed by an infrastructure network customization manager 614 (also referred to as a manager of infrastructure network customization). A slice customization controller 618 is also illustrated, which operates to define customized network slices, for example based on customer requirements, as described elsewhere herein.

In the first use case example the CSM-AAA 622 is operative to perform AAA for each of the fixed nodes/devices 630. The infrastructure network learning controller 616 is operative to configure each of nodes/device to control the learning phase. The infrastructure network customization manager 614 is operative to configure the nodes/devices for operation. As illustrated in the embodiment of FIG. 6A, these services are configured as a STAR topology.

Further in the first use case example, DAM is configured to collect data from communication elements and infrastructure equipment. QoS requirements are associated with the logical connections. The communication elements include fixed communication elements, such as network nodes and fixed networked devices 630.

Figure 6B:
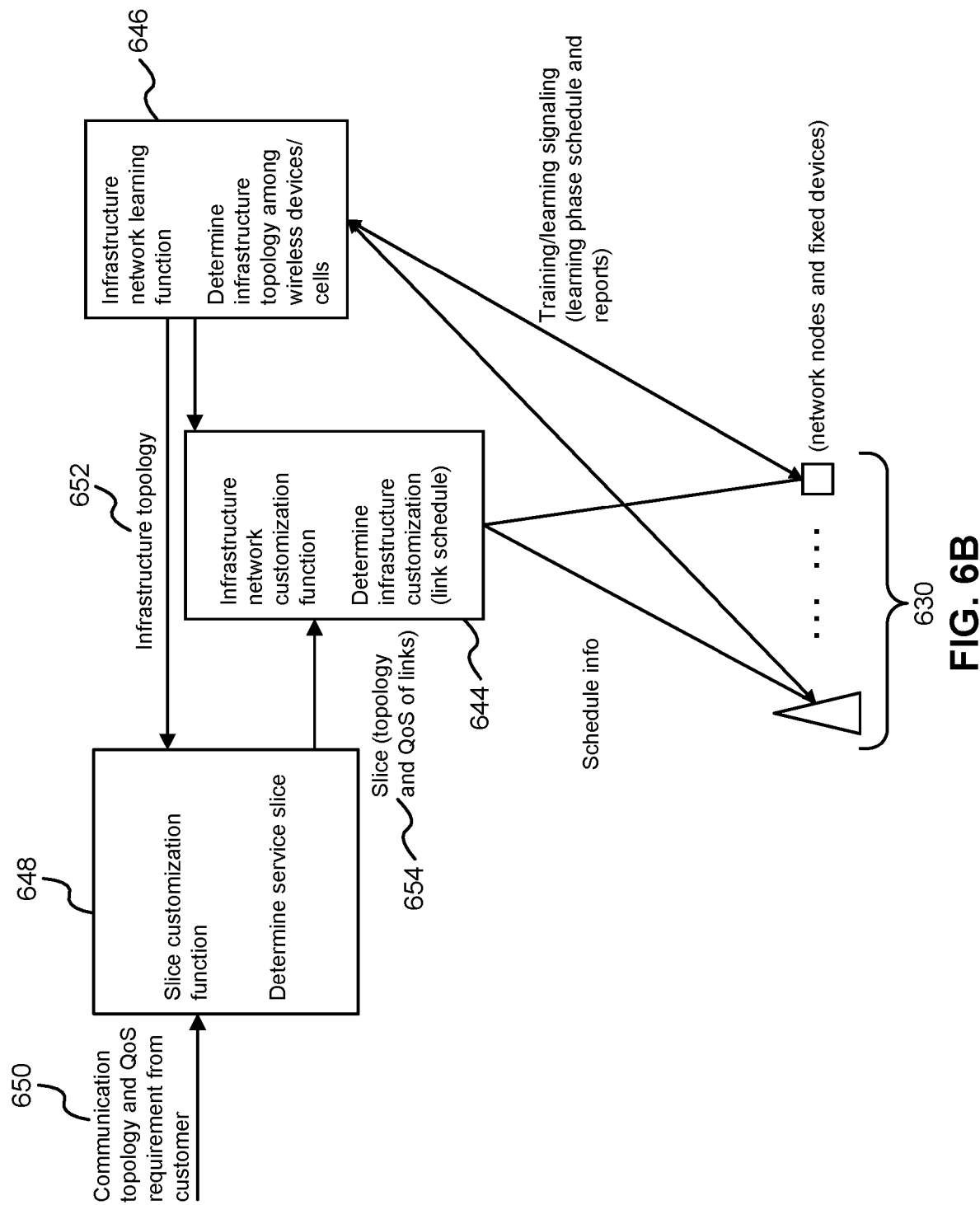
FIG. 6B illustrates another use case example embodiment of the present invention.

FIG. 6B illustrates a variation of FIG. 6A, in which the AAA, DAM and PA functions are omitted for clarity, and operational relationships between the infrastructure network learning function 646 (comparable to infrastructure network learning controller 616), slice customization function 648 (comparable to slice customization controller 616) and infrastructure network customization function 644 (comparable to infrastructure network customization manager 614) are shown in more detail. FIG. 6B is explained in more detail below. FIG. 6A can include similar features. Network nodes and fixed devices 630 are also illustrated. The fixed devices may be viewed as client devices accessing the wireless network.

Consider a factory, city, or other environment having a number of wireless communication devices in fixed locations (mobile devices can also be considered in other embodiments). The devices can be generally regarded as network nodes 630, and can include end use devices such as Internet of Things (IoT) devices integrated into machinery or other environmental equipment, as well as management devices and wireless access points or base stations. Once the devices are deployed in an environment, it is possible to monitor their wireless transmission and reception operations to determine which devices are capable of communicating with each other, and the parameters (e.g. signal to noise ratios (SNRs)) associated with such communications. This information is referred to as an available infrastructure network topology and can be conceptualized as a network graph comprising network nodes and communication links therebetween with specified characteristics (e.g. SNRs). This process can be managed by the infrastructure network learning function 646, by directing various devices to perform transmission and reception functions according to a specified available infrastructure network topology learning schedule (or simply learning schedule), and to report the results according to a specified observation reporting schedule (or simply reporting schedule).

The learning schedule can be as illustrated in FIG. 3. That is, the learning schedule can indicate, for each network node, different transmission operations, reception operations, or both, to perform at different times. The learning schedule can indicate parameters of the transmission or reception operations, as well as parameters to be recorded and reported. Nodes can perform the transmission and reception operations according to the learning schedule, as well as subsequent recording and reporting operations, as illustrated for example in FIG. 4.

For the purpose of implementing the learning process, the infrastructure network learning function 646 is communicatively coupled (directly or indirectly) to the network nodes 630. In some embodiments, the learning schedule is structured and includes instructions to transmit test messages at specified times from specified nodes, and to monitor for those test messages at other specified times at other specified nodes. Different test messages can be transmitted concurrently or sequentially, or a combination thereof. Different test messages can be transmitted at different specified powers, in order to determine which transmit power is required for an adequate communication link between nodes. In some embodiments, the learning schedule instructs nodes to monitor and report on communications operations that occur during their normal operation, over a predetermined period of time.

For example, in one embodiment, each node 630 can transmit a test message at a specified time and at a specified power, and each other node can monitor to determine whether this test message can be received and decoded. Multiple test messages can be transmitted, with different physical parameters. For each successful communication of a test message between a given transmitting node and a given receiving node, the infrastructure network learning function determines that a link between the given transmitting node and the given receiving node is available, at least for the specified physical parameters used in that test message.

In some embodiments, the infrastructure network learning function can operate as illustrated in FIG. 5, in order to identify network links between transmitting nodes and receiving nodes as available network links in the available infrastructure network topology. That is, network links can be identified as being available when they have sufficient SNR levels.

Identifying the available network links is performed based on an evaluation of the communication node records. In particular potential (i.e. candidate) network links are evaluated and deemed to be available network links if a performance requirement, such as a sufficient SNR level, is met for that potential network link.

Based on the determined available infrastructure network topology 652, various customizations can be carried out. The available infrastructure network topology information can be provided to an infrastructure network customization function 644, a slice customization function 648, or both. The slice customization function 648 can also be provided with customer requirements 650, such as communication topology requirements and quality of service (QoS) requirements. For example, the customer requirements 650 may specify which devices should be directly connected to each other via communication links, the parameters of communication links required between devices (either directly or indirectly connected), etc. The customer requirements 650 may also specify the communication characteristics for certain devices (e.g. when and how often they communicate, the type of information communicated, etc.) Based on the available infrastructure network topology information 652 and the customer requirements 650, the slice customization function 648 can be configured to specify parameters 654 for one or more service slices to be deployed to support the customer. Each service slice is a network slice or virtual network having a defined network topology with specified links, and specified QoS for each link. The service slice may define other aspects such as network functions, resource allocations of equipment, allocations of communication resources to be used, etc.

The parameters 654 specified for the service slices are provided, along with the available infrastructure network topology information 652, to the infrastructure network customization function 644. The infrastructure network customization function 644 defines a service customized infrastructure network, having a topology which consists of nodes and links belonging to (and typically a strict subset of) the available infrastructure network topology 652. Furthermore, the service customized infrastructure network includes nodes and links which are sufficient to support the one or more service slices that are to be deployed. This includes a sufficient number of nodes, and types of nodes, at required locations, and with required quality of links between nodes, in order to support the service(s) to be operated using the network slice(s).

The service customized infrastructure network is also defined, by the infrastructure network customization function 644, to include a specific schedule (link schedule), specifying communication operations between network nodes. The schedule may be a fixed communication schedule. That is, nodes receive, store and operate according to the schedule indefinitely until it is updated. The schedule can define times at which specified nodes communicate with other specified nodes, portions of a pool of shared wireless resources (e.g. frequencies, time slots, codes, modulation and coding schemes, or other physical parameters) used for such communication, or a combination thereof. The schedule can be communicated to the nodes and subsequently used thereby. For this purpose, the infrastructure network customization function is communicatively coupled (directly or indirectly) to the network nodes. The network nodes may be provided with configuration instructions, including the instructions to communicate according to the schedule, prior to deployment of the service. The network nodes may additionally be reconfigured after deployment of the service.

Accordingly, because a service customized infrastructure network is deployed, the need for a real-time scheduler is mitigated. A real-time scheduler can still be included, in some embodiments, in the case where mobile nodes are also present in the service customized infrastructure network. When the real-time scheduler is omitted or reduced in its scope of operations, the network is simplified and more efficient. The efficiency is achieved in part because scheduling messages are not required, or required to a lesser extent. Instead, the nodes are provided with a schedule a priori. This schedule is referred is referred to as a fixed communication schedule, and nodes are directed to communicate according to it, typically for a period of time encompassing multiple successive communication opportunities. This is possible due to the predictability of communications operations which in turn is derived from knowing the customer requirements and (through learning) the available infrastructure network topology.

Figure 7:
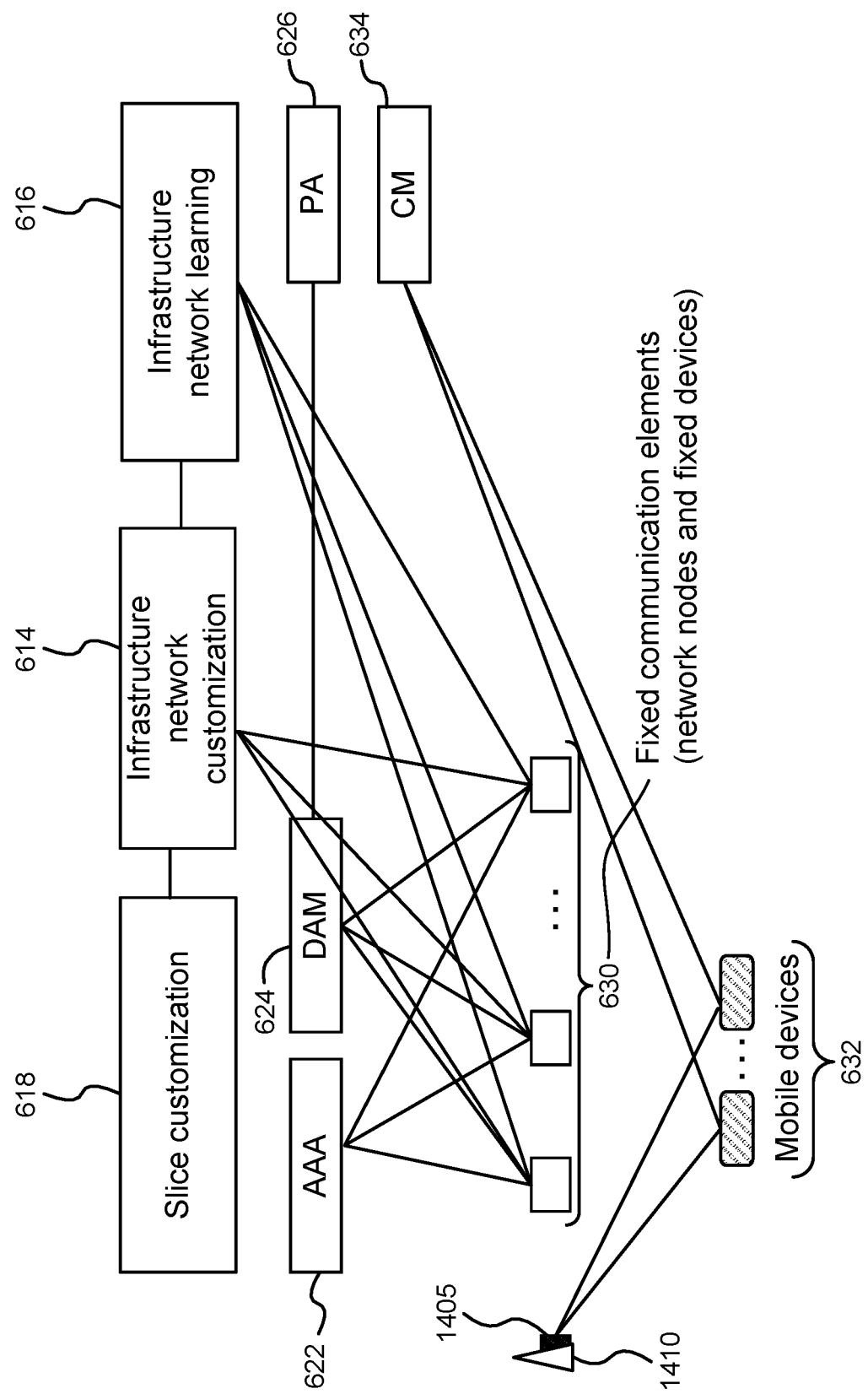
FIG. 7 illustrates a use case example embodiment of the present invention, assuming a combination of fixed nodes/devices and mobile devices having non-predictable mobile paths and traffic pattern.

FIG. 7 refers to a second use case example assuming a combination of fixed EDs 630 and mobile EDs 632 having non-predictable mobile paths and traffic pattern. In this case network links supporting the mobile EDs are preferably dynamic and, accordingly, a dynamic link scheduler, also referred to as a real-time scheduler 1405, may be conveniently included to support the AN(s) 1410. In some aspects, the real-time scheduler 1405 may comprise a network function instantiated at, or logically close to, the AN 1410. The NOS functions for the mobile and non-predictable case may include: an infrastructure network learning controller 616; SONAC-COM; customization of infrastructure network (e.g. an infrastructure network customization manager 614); CSM (AAA 622, performance assurance 626); DAM 624; CM 634; and real-time per-link scheduler 1405. The real-time scheduler 1405 operates to schedule communication with the mobile EDs 632. The slice customization controller 618 is also present.

The mobile EDs 632 may be networked vehicles, autonomous mobile devices, mobile camera or other monitoring equipment, mobile machinery, or mobile user equipment, etc. During learning of the available infrastructure network topology, test mobile EDs can be made to move through a predetermined area, periodically transmitting test messages according to the learning schedule, and monitoring for messages transmitted by other EDs according to the learning schedule. When a mobile ED reports information obtained during learning, it can also report its location at the time of each observation being reported. The infrastructure network learning controller 616 (or its corresponding function) can then use this information to generate scheduling information indicating which fixed devices (e.g. base stations) should be used to communicate with mobile EDs with given requirements in a given area. This scheduling information may be provided to the real-time scheduler 1405 and used thereby to schedule communications with mobile EDs following the learning phase. This providing may be performed by the infrastructure network customization manager 614 as part of customization of the infrastructure network. That is, the real-time scheduler 1405 may be customized based on information gathered during the learning of the available infrastructure network topology. Other aspects of FIG. 7 are the same as or similar to those of FIGS. 6A and 6B.

In the second use case example, there is a similar service level topology as for the first use case example. In this case, CM communicates with mobile devices and CM also has a STAR service level topology. The real-time scheduler 1405 has a STAR topology with the mobile devices.

For vertical/industry customers, all of these functions supporting a network slice can share a same NOS slice resource for their individual requirements. In some embodiments, NOS messages may be differentiated between functions by including a message type field to indicate in each NOS message which of the functions, such as SONAC-COM, Learning control, DAM, CM, InfM, etc., is affiliated with that NOS message.

Embodiments of the systems and methods described herein provide for the ability to integrate control/management functionalities to simplify network deployment/operation/maintenance. The initial learning process, and optionally the ability to perform on-going learning of current infrastructure network capabilities, optimal network deployment/operation/maintenance becomes possible by effectively allocating, and optionally re-allocating, resources to support a network slice in meeting its service requirements.

Unlike current methods, which require either over-allocation to ensure meeting high service requirements, or allowing service requirement slippage in times of high demand, equipment failure, or other inability of allocated resources to meet current requirements, the embodiments described herein allow for accurate initial allocation based on specific service requirements, and allows for re-allocation based on current requirements or resource availability.

In some embodiments, machine learning or artificial intelligence (AI) may be used to allow for a reactive allocation process that adapts resource allocation for a network slice in response to changing customer requirements while meeting an established service policy for that network slice.

In some embodiments, network robustness may be enabled by identifying specific network links that may require higher reliability and allocating alternative links to support dual connections to maintain service through infrastructure failure affecting one of the links. In some embodiments, the dynamic learning and re-allocation of network resources may provide for a self-healing network that is operative to instantiate backup or alternative links to support service requirements while the original link problem is being addressed.

FIGS. 8 to 13 provide illustrative embodiments of use case examples and network infrastructure topologies to better describe the systems and methods described herein.

Figure 8:
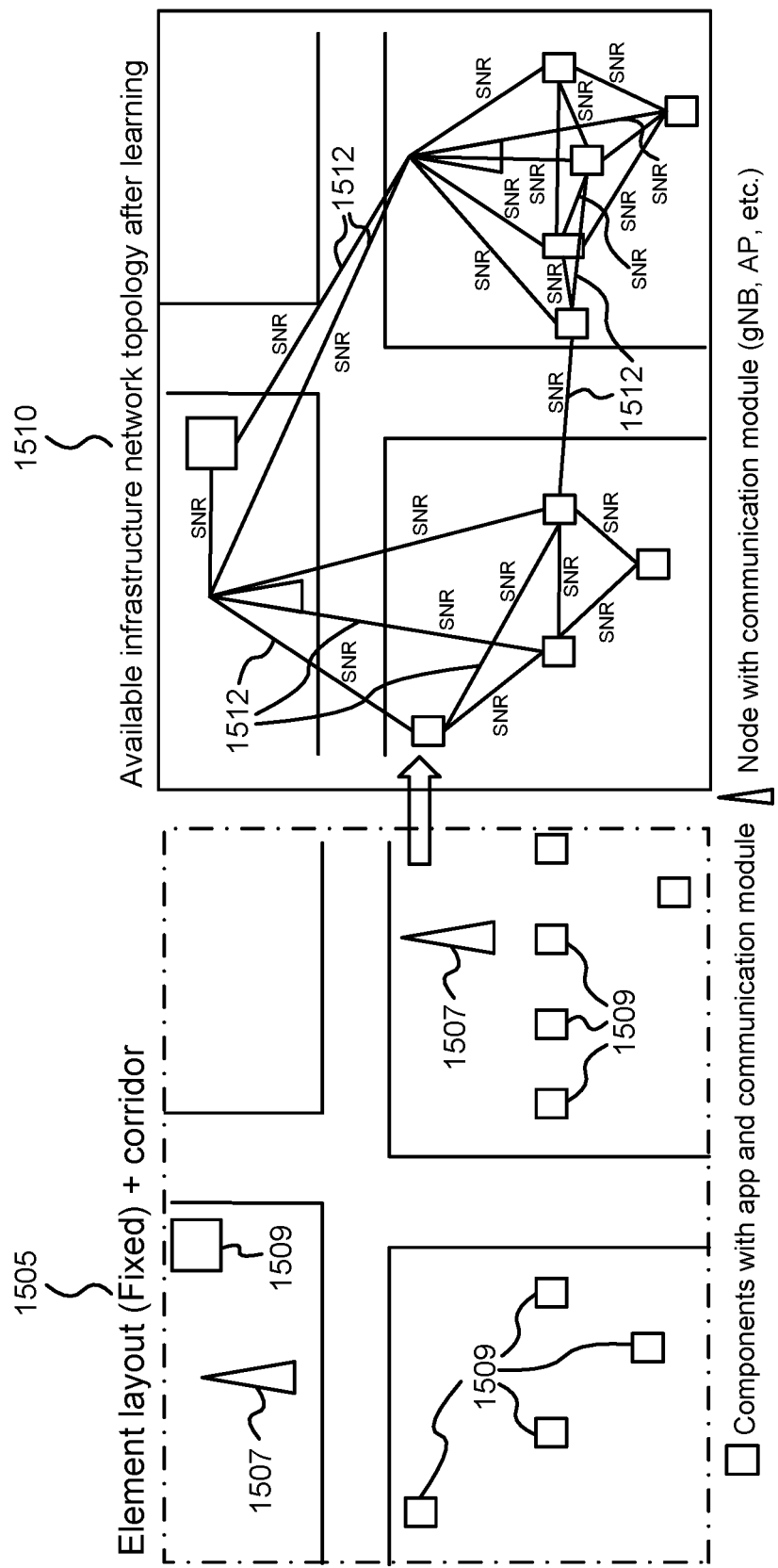
FIG. 8 illustrates a use case example embodiment of the present invention, assuming fixed nodes/devices and a predictable traffic pattern.

Referring to FIG. 8, a use case example is provided for fixed nodes/devices with a predictable traffic pattern. Element layout 1505 illustrates the various hardware components including components 1509 with an application module and a communication module, e.g. network nodes and UEs, and components 1509 that are primarily communication modules, e.g. gNB, AP, etc.). The element layout 1505 may be pre-defined for the learning module, for instance based on a network architecture diagram, or may be constructed by the learning module evaluating the network components. In some aspects the element layout 1505 may be developed by a combination of pre-definition and machine learning.

In the example use case of FIG. 8 it is intended that a vertical customer, such as a business or utility, is able to provide an element layout 1505 of available network nodes 1507 and EDs 1509 indicating their relative logical locations. After performing the systems and methods described herein, an available infrastructure network topology 1510 may be constructed indicating the available connections 1512 between nodes/devices of the network. The available infrastructure network topology includes, in addition to the elements defined in the element layout 1505, a set of links connecting the elements. Each of the links may be associated with a link quality, such as SNR, that was determined during the learning phase. In various embodiments, operations of FIG. 8 are performed by the infrastructure network learning controller 616 (or infrastructure network learning function 646).

Figure 9:
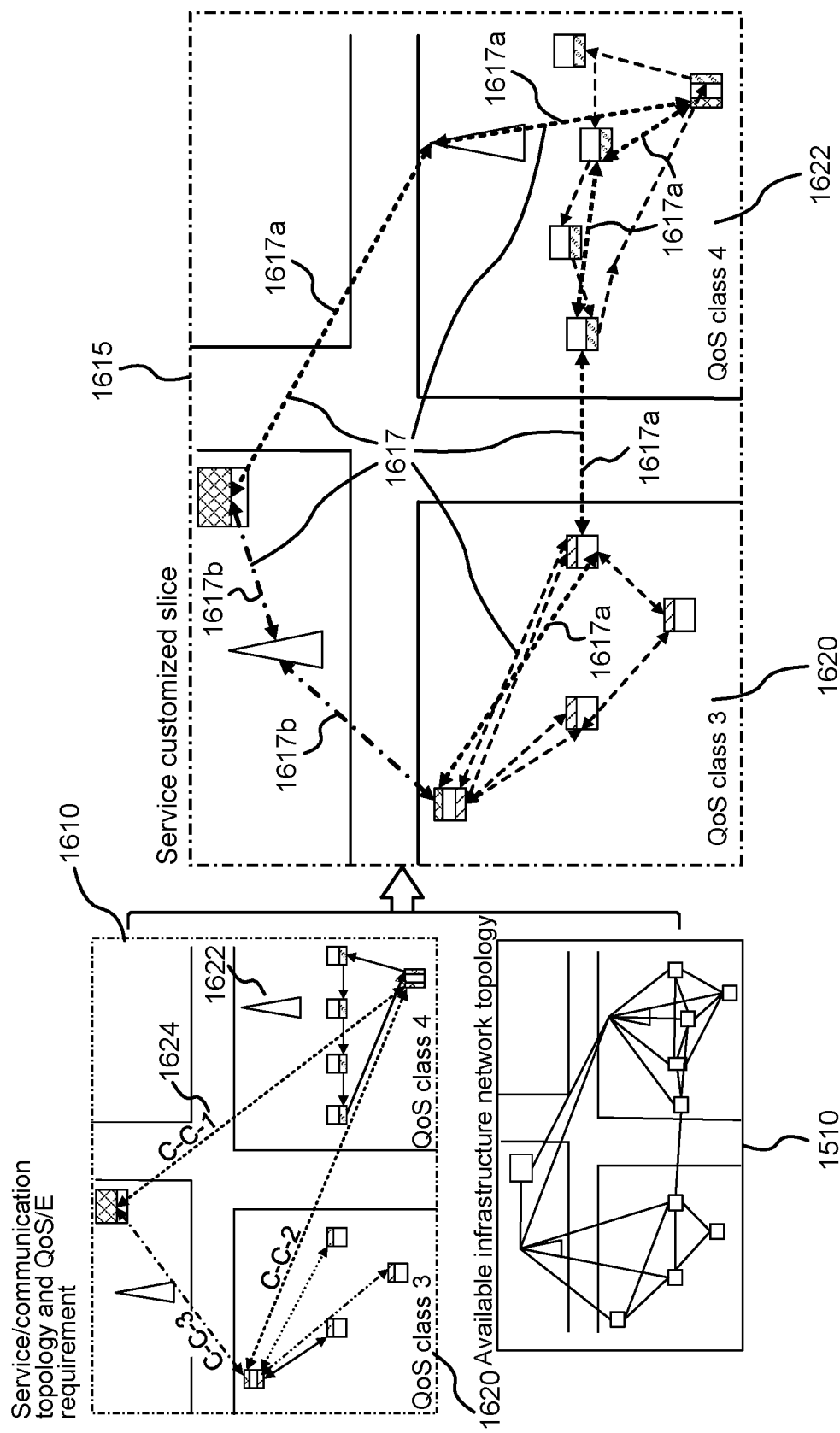
FIG. 9 illustrates determination of a customized network slice or slices, based on an available infrastructure network topology and a service level topology defined for the service to be supported, according to embodiments of the present invention.
Figure 10:
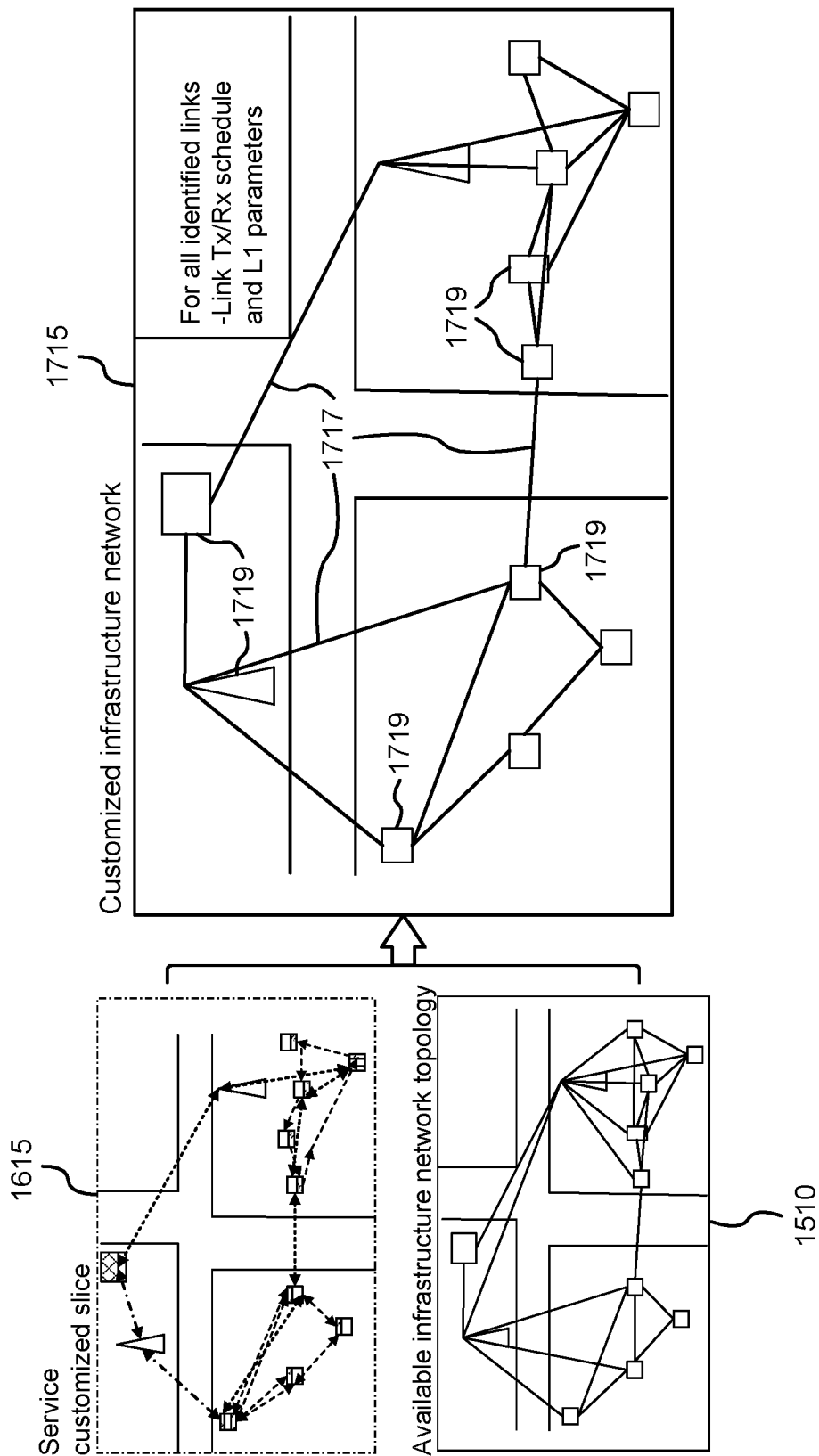
FIG. 10 illustrates determination of a customized infrastructure network based on an available infrastructure network topology and a designed service-customized slice, according to embodiments of the present invention.

In more detail, FIGS. 8 to 10 can be regarded as illustrating an example use case based on FIGS. 6A and 6B, where the network nodes are in fixed locations. FIGS. 8, 9 and 10 illustrate successive operations carried out in series, for example following the order of operations shown in FIG. 6B. Some of the network nodes may be base stations while the others may be operatively coupled to industrial machines, monitoring equipment, or other end devices. The infrastructure network learning function directs the components (i.e. the network nodes 1507 and EDs 1509) to perform the operations described for example in FIG. 4. For clarity, the EDs 1509 can also be considered to be network nodes in a more general sense. Based on the obtained information, the infrastructure network learning function determines the available network infrastructure topology 1510, based for example on operations such as illustrated in FIGS. 5 and 6B. The determined topology 1510 is passed to the infrastructure network customization function. For each connection 1512 (i.e. link), a SNR value is provided. Each SNR value may be specific to its associated link, but all SNR values will generally be higher than a threshold value deemed adequate for communication between endpoints of the associated link.

In the example use case of FIG. 9, a customized network slice 1615, or slices, may be determined based on an available infrastructure network topology 1510 and a service level topology 1610 defined for the service to be supported. The service level topology defines QoS/QoE requirements for the network slice, as well as any service/communication topologies that need to be defined. In the example use case of FIG. 9, the service level topology of devices in PLC1 group 1620 is a STAR topology, devices in PLC group 2 1622 is a chain topology, and the service level topology in C-C group 1624 is a mesh topology. Each connection/link in these topologies 1620, 1622, 1624 may be associated with a set of QoS requirements and optionally a traffic transmission plan. A service-customized network slice 1615 may be designed based on the service level topology 1610 and the available infrastructure network topology 1510. In various embodiments, operations of FIG. 9 are performed by the slice customization controller 618 (or slice customization function 648).

The service level topology may be a logical network topology. The service level topology may define a subset of network nodes and communication requirements (e.g. QoS requirements) between pairs of this subset.

The slice 1615 may be defined based on the service level topology, QoS requirements, traffic plan and available infrastructure network topology 1510. The network slice may be designed based on service level requirements, service level description, and available infrastructure topology. The network slice definition may indicate the slice logical topology, the logical link capacity, and communication protocols to be used. The slice logical topology is defined according to logical links 1617 between nodes.

Referring to the service level topology 1610, C-C group 1624 includes three nodes logically connected by QoS class 1 or QoS class 2 links. PLC1 group 1620 includes four nodes logically connected by QoS class 3 links, and PLC2 group 1622 includes six nodes logically connected by QoS class 4 links. Referring to the service customized slice 1615, different nodes are again connected by links belonging to different QoS classes. These connections are such that the specified QoS of the logical connections in service level topology 1610 are supported. In particular, a path consisting of QoS class 1 links 1617a is defined in order to support the QoS class 1 logical connections between members of C-C group 1624, and a path consisting of QoS class 2 links 1617b is defined in order to support the QoS class 1 logical connections between members of the C-C group 1624. The remainder of the links in PLC1 group 1620 are QoS class 3 links and the remainder of the links in PLC2 group 1622 are QoS class 4 links. The physical link topology of the service customized slice 1615 supports the logical link topology of the service level topology 1610. For example, whereas the service level topology 1610 defines QoS class 1 and class 2 logical links directly between different network nodes, the service customized slice defines QoS class 1 and class 2 paths which link these network nodes indirectly, via intermediate nodes and multiple hops.

At least the topology of the customized network slice (i.e. the customized network slice topology) is determined based on the available infrastructure network topology and the service level topology. Other aspects of the network slice, such as the proportions of resources allocated thereto, may also be determined. The service level topology 1610 can be specified by a customer subscribing to the service. Arrows (e.g. between nodes in the service level topology 1610 and slice definition 1615, as well as in other figures) denote the direction of data flow in communications between nodes. This can be based on specifications by the customer as part of the service level topology 1610. In particular, the customized network slice topology may specify network nodes and interconnections therebetween, where the nodes and interconnections are a subset of the available infrastructure network topology. The customized network slice topology can include nodes, and link qualities, are adequate for delivering a service according to the service level topology. The customized network slice topology can be a logical network topology.

In the example use case of FIG. 10, a customized infrastructure network 1715 may be determined based on an available infrastructure network topology 1510 and a designed service-customized slice 1615. Given the designed service-customized slice 1615, an infrastructure network customization manager is operative to determine which links of the available links will be allocated to the customized infrastructure network 1715. For each allocated node/device corresponding to the allocated links, the controller (e.g. the infrastructure network customization manager) defines the per link connection parameters, such as Tx/Rx schedule, Tx/Rx physical layer parameters, and Rx parameters. Finally, the infrastructure network customization manager configures each of the allocated nodes/devices based on the defined per link connection parameters corresponding to that node/device. The end result is a service-customized infrastructure network 1715 allocated and configured to support the service-customized slice 1615 from the available infrastructure network topology 1510. The customized infrastructure network may define, for each link 1717 or communication node or ED 1719, physical communication parameters (e.g. link transmit/receive schedules, L1 parameters, transmit/receive beam usage, transmit/receive times, transmit/receive radiofrequency assignments, transmit code usage, time alignments, transmit/receive schedules, etc.). In various embodiments, operations of FIG. 10 are performed by the infrastructure network customization manager 614 (or infrastructure network customization function 644).

Figure 11:
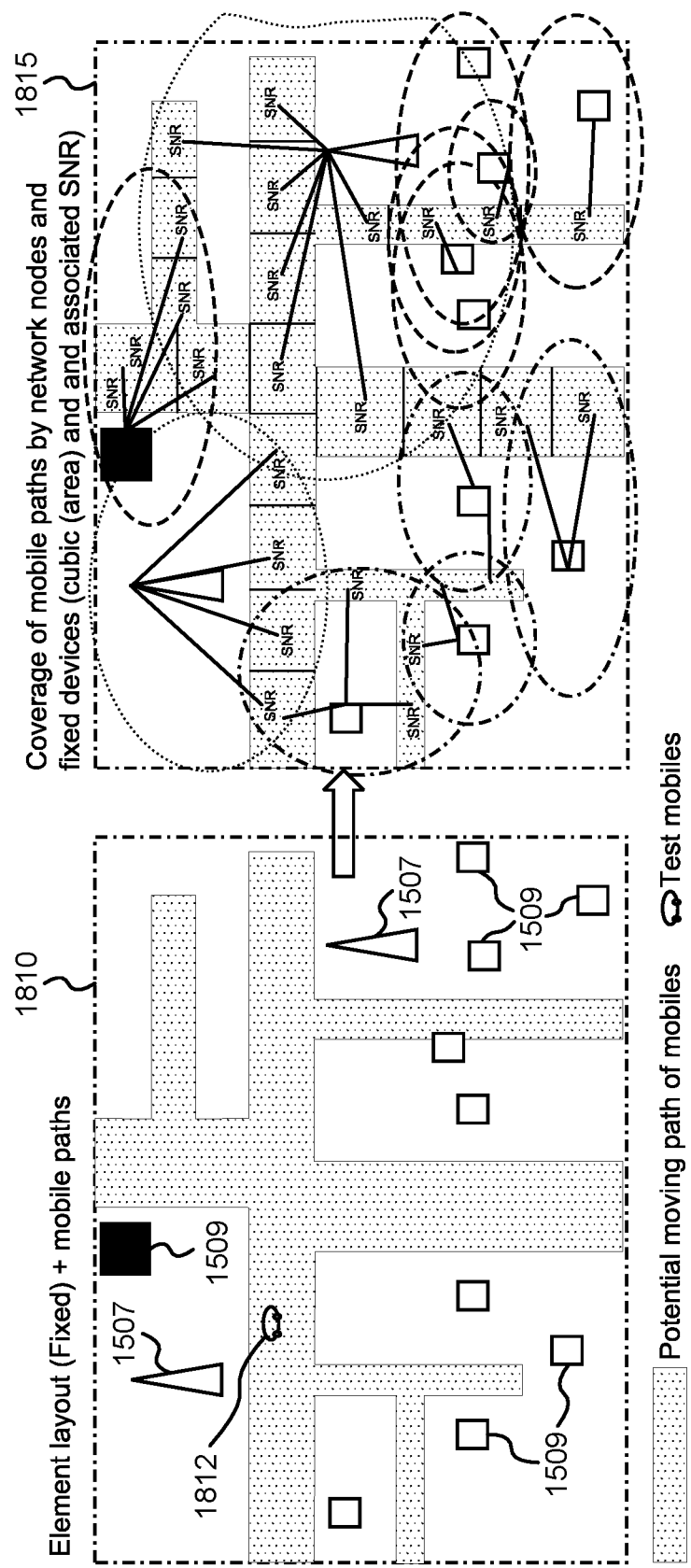
FIG. 11 illustrates learning for a combined fixed and mobile layout, according to embodiments of the present invention.

In the example use case of FIG. 11, learning for a combined fixed and mobile layout is illustrated. The element layout 1810 includes fixed components 1507, 1509, as well as one or more test mobile components 1812. The test mobile component 1812 may preferably be moved through a pre-defined moving path covering all available mobile paths, such as roads, that are intended to be covered by the network. In the example illustrated, the test mobile component 1812 is operative to traverse along the available mobile paths, indicated in grey paths. During the learning phase, a test mobile component 1812, based on a predefined moving path, traverses across the available paths. At the same time, based on a predefined Tx/Rx schedule table, the test mobile component 1812 may transmit pilot tones and receive signals from other nodes/devices 1507, 1509 available in the network. After the learning phase, the learning controller will create a coverage map 1815, where for each cubic (or bin), available links with SNR are identified. FIG. 11 illustrates the same layout of fixed nodes/devices 1507, 1509 as FIGS. 8 to 10, and these fixed nodes/devices can be interconnected as shown in those figures. The available links indicate the node(s)/device(s) 1507, 1509 which a mobile component can connect with from a given location. The locations are binned together into rectangular areas for simplicity. SNR values for each available link are determined and associated with that link. In various embodiments, operations of FIG. 11 are performed by the infrastructure network learning controller 616 (or infrastructure network learning function).

In more detail, the test mobile component can inform the infrastructure network learning function of its locations as they are reached or according to a planned schedule, or the infrastructure network learning function can control the location of the test mobile component. Then, at a plurality of locations, the test mobile component can monitor for test messages, transmit test messages, or both. The test messages can be transmitted according to a learning schedule directed by the infrastructure network learning function, for example as illustrated in FIGS. 3 and 4. By processing the reported results of the test messaging for multiple locations of the test mobile component, for example as illustrated in FIG. 5, the infrastructure network learning controller can generate the coverage map 1815. The coverage map indicates, for each location area (bin), the stationary node/device that a mobile device in that location area should communicate with, as well as the SNR for the link with that stationary node/device.

Figure 12:
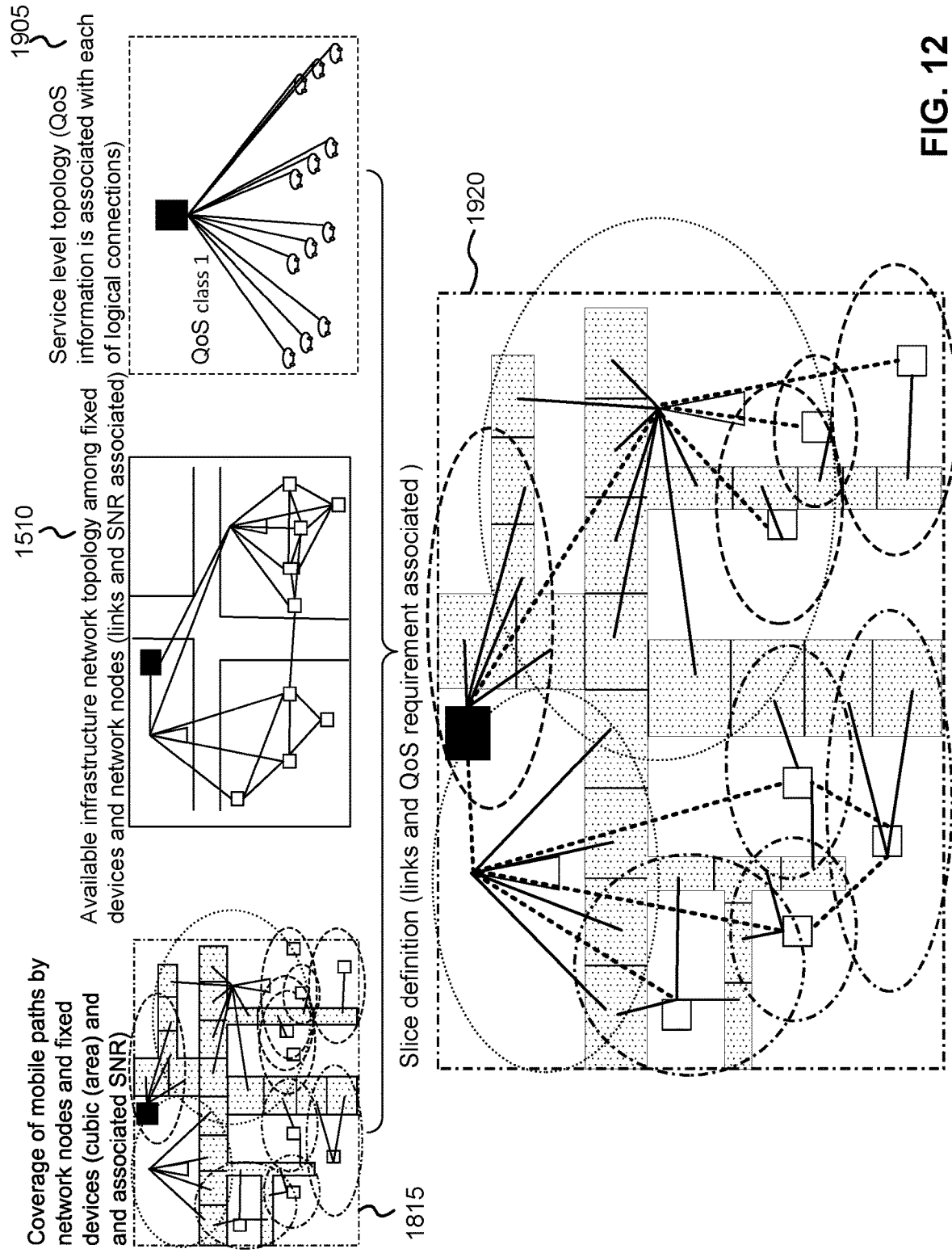
FIG. 12 illustrates an example use case in which a service-customized network slice is defined, according to embodiments of the present invention; and, FIG. 13 illustrates an example use case in which a customized infrastructure network is allocated and configured based on a service-customized network slice and the available infrastructure network topology, according to embodiments of the present invention.

In the example use case of FIG. 12, given a service level topology 1905, a STAR topology in this example including QoS requirements for each logical connection, and available infrastructure network topology 1510 and coverage map 1815, a slice designer may design a service-customized network slice 1920 that defines the allocated links and their associated QoS requirements. The service-customized network slice 1920 can be automatically designed. The service-customized network slice 1920 utilizes backhaul links between nodes 1507, 1509, which correspond to less than all of the available backhaul links defined in the available infrastructure network topology 1510 (defined for example as shown in FIGS. 8 to 10). Some of the links are not utilized. The service-customized network slice 1920 utilizes radio access links defined according to the coverage map 1815. These links are determined so that they exhibit adequate SNR for supporting a required service level. In various embodiments, operations of FIG. 12 are performed by the slice customization controller 618 (or slice customization function).

The service level topology 1905 can be specified by the customer, similarly to the service level topology 1610. As shown, the service level topology specifies logical connections of multiple mobile devices with a central controller in a star configuration. However, other configurations of logical connections can also be specified. Each logical connection is associated with a specified QoS level or class requirement. The service-customized network slice is designed to meet these QoS requirements, for example by allocating links with sufficient SNR, bandwidth, etc.

Figure 13:
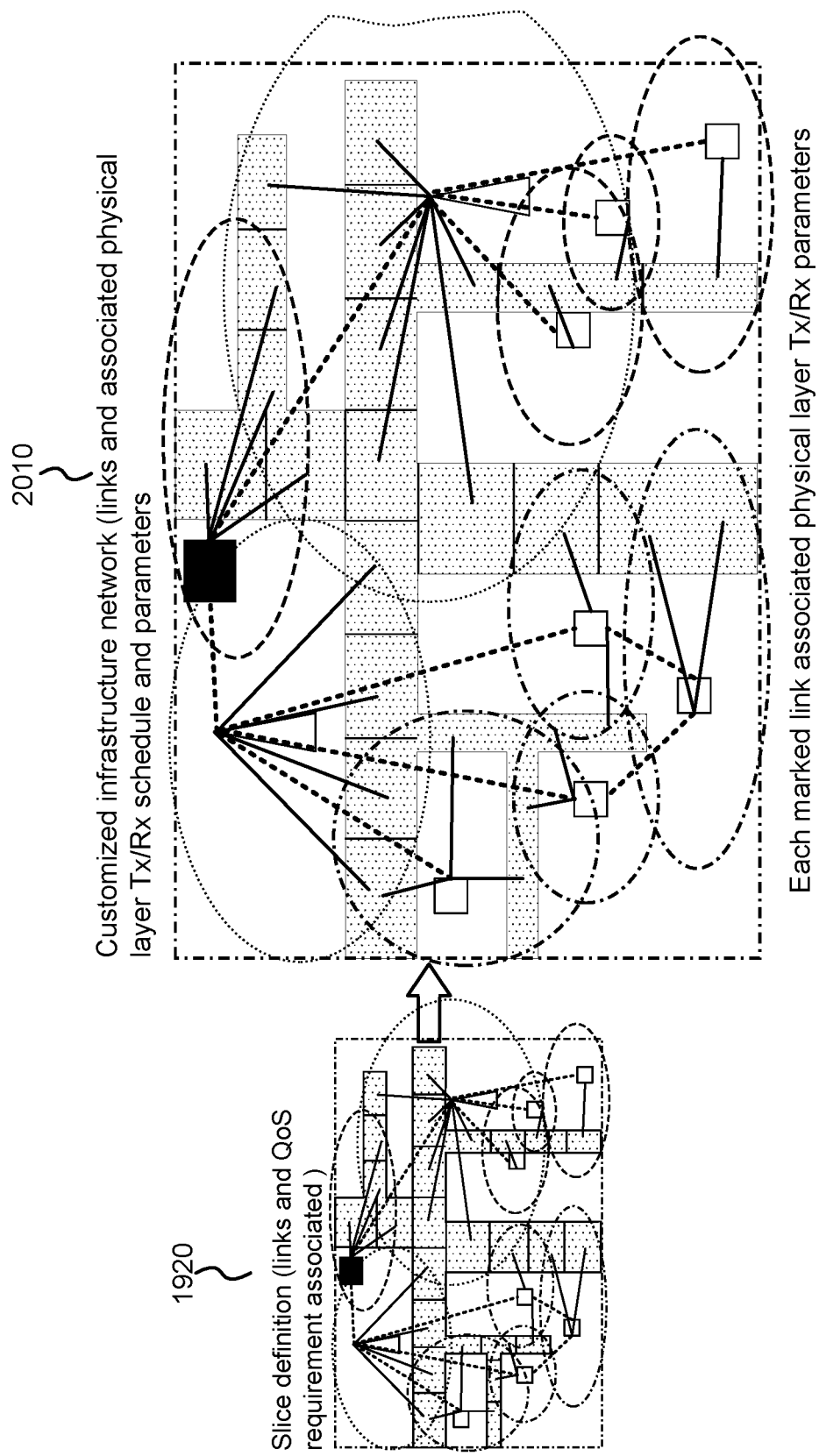

In the example use case of FIG. 13, a customized infrastructure network 2010 may be allocated and configured based on a service-customized network slice 1920 and the available infrastructure network topology 1510. The customized infrastructure network 2010 includes a set of allocated nodes/devices and, for each of the allocated links corresponding to the allocated nodes/devices, defined Tx/Rx schedule and link parameters. The final step is configuring each of the allocated nodes/devices based on the defined Tx/Rx schedule and link parameters. For mobile devices, a location-dependent Tx/Rx schedule and link parameters are defined and configured for each mobile device. In some aspects, the mobile device may only be configured with a sub-set of the location-dependent Tx/Rx schedule and link parameters. The network is operative to configure a further sub-set of location-dependent Tx/Rx schedule and link parameters based on a current location of each mobile device. In some aspects, each mobile device may only be configured with a sub-set of location-dependent Tx/Rx schedule and link parameters. In various embodiments, operations of FIG. 12 are performed by the infrastructure network customization manager 614 (or infrastructure network customization function).

In the present example, the customized infrastructure network 2010 has the same set of network nodes, network links, and mobile device service coverage areas as is defined in the service-customized network slice 1920. However, the customized infrastructure network additionally defines link parameters and transmission/reception scheduling information for the network. Additionally, in some embodiments, if the customized infrastructure network is designed to support multiple network slices (e.g. different service-customized network slices defined according to the preceding discussion), then the network topology may be configured so as to support all such slices.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A slice customization controller comprising:
   a network interface for receiving data from or transmitting data to network functions connected to a communication network;
   a processor; and
   a non-transitory memory for storing instructions that when executed by the processor cause the slice customization controller to be configured to define a customized network slice topology to be established using a plurality of network nodes interconnected by a set of network links of a communication network, the slice customization controller being operative to:
   receive a customer-defined service level topology defining a subset of the plurality of network nodes and communication requirements therebetween;
   receive an indication of an available infrastructure network topology consisting of a set of available network nodes and a set of available network links interconnecting the set of available network nodes, the available infrastructure network topology identified based on observations, by the plurality of network nodes, of network operations in comparison with specified network performance criteria, the available infrastructure network topology being determined by a learning function operative on at least one of the plurality of network nodes based on observing wireless communication operations during a learning phase; and
   transmit an indication of the customized network slice topology determined based on the customer-defined service level topology and the available infrastructure network topology, the customized network slice topology specifying network nodes and interconnections from the available infrastructure network topology which are adequate for delivering a service according to the service level topology.

2. The slice customization controller of claim 1, wherein the communication requirements include quality of service (QoS) requirements.

3. The slice customization controller of claim 1, wherein the service level topology defines one or more of: quality of service (QoS) requirements for the network slice, a network topology for the network slice or a logical network topology for the network slice.

4. The slice customization controller of claim 3, wherein the network topology or the logical network topology includes a star topology, a chain topology, a mesh topology, or a combination thereof.

5. The slice customization controller of claim 1, wherein at least one connection in the service level topology is associated with a traffic transmission plan.

6. The slice customization controller of claim 1, wherein the network performance criteria are indicative of one or more of: communication signal reliability, communication signal strength, communication error rates, tolerance to interference, or levels of interference.

7. The slice customization controller of claim 1, wherein the network nodes and interconnections which are adequate for delivering the service consist of network nodes and interconnections which are capable of communication using a signal to noise ratio which is adequate for supporting a required service level associated with said communication requirements.

8. The slice customization controller of claim 1, wherein during the learning phase the plurality of network nodes are configured to automatically perform specified communication operations according to a schedule for said observing wireless communication operations, the observing wireless communication operations comprising automatically recording and reporting network performance by the plurality of network nodes.

9. The slice customization controller of claim 1, wherein the available infrastructure network topology indicates the set of available network links between specified pairs of the plurality of network nodes and signal strengths of said available network links, said available network links and signal strengths determined by the learning phase, and wherein the customized network slice topology utilizes at least some of said available network links in combination to provide the customer-defined service level topology.

10. A system comprising:
    the slice customization controller of claim 1; and
    an infrastructure customization manager comprising:
    the network interface or another network interface for receiving data from and transmitting data to network functions connected to the communication network;
    the processor or another processor; and
    the non-transitory memory or another non-transitory memory for storing instructions that when executed by the processor or the other processor cause the infrastructure customization manager to be configured to configure the communication network to deliver the service, the communication network comprising the plurality of network nodes interconnected by the set of network links, the infrastructure customization manager being operative to:
    receive the indication of the available infrastructure network topology;

receive the indication of the customized network slice topology; and prior to deployment of the service, transmit instructions to a subset of nodes belonging to the set of available network nodes, the instructions configuring said subset of nodes to communicate according to a fixed resource allocation including a fixed communication schedule, the subset of nodes and the fixed resource allocation being adequate to deliver the service according to the customized network slice topology.

11. The system of claim 10, wherein the fixed communication schedule defines one or more of: times at which specified nodes communicate with other specified nodes, portions of a pool of shared wireless resources to be used for communication, or a combination thereof.

12. The system of claim 11, wherein the pool of shared wireless resources include communication frequencies, time slots, codes, and modulation and coding schemes.

13. A method comprising, by a slice customization controller of a communication network:

receiving a customer-defined service level topology defining a subset of a plurality of network nodes of the communication network, and communication requirements therebetween;

receiving an indication of an available infrastructure network topology consisting of a set of available network nodes and a set of available network links interconnecting the set of available network nodes, the available infrastructure network topology identified based on observations, by the plurality of network nodes, of network operations in comparison with specified network performance criteria, the available infrastructure network topology being determined based on by observation of wireless communication operations during a learning phase; and transmitting an indication of a customized network slice topology determined based on the customer-defined service level topology and the available infrastructure network topology, the customized network slice topology specifying network nodes and interconnections from the available infrastructure network topology which are adequate for delivering a service according to the service level topology.

14. The method of claim 13, wherein the communication requirements include quality of service (QoS) requirements.

15. The method of claim 13, wherein the service level topology defines one or more of: quality of service (QoS) requirements for the network slice, a network topology for the network slice or a logical network topology for the network slice.

16. The method of claim 13, wherein at least one connection in the service level topology is associated with a traffic transmission plan.

17. The method of claim 13, wherein the network performance criteria are indicative of one or more of: communication signal reliability, communication signal strength, communication error rates, tolerance to interference or levels of interference.

18. The method of claim 13, further comprising, by an infrastructure network customization manager of the communication network:

receiving the indication of the available infrastructure network topology;

receiving the indication of the customized network slice topology; and prior to deployment of the service, transmitting instructions to a subset of nodes belonging to the set of available network nodes, the instructions configuring said subset of nodes to communicate according to a fixed resource allocation including a fixed communication schedule, the subset of nodes and the fixed resource allocation being adequate to deliver the service according to the customized network slice topology.

19. The method of claim 18, wherein the fixed communication schedule defines one or more of: times at which specified nodes communicate with other specified nodes, portions of a pool of shared wireless resources to be used for communication, or a combination thereof.

20. The method of claim 13, wherein during the learning phase the plurality of network nodes automatically perform specified communication operations according to a schedule for said observation of wireless communication operations, the observation of wireless communication operations comprising automatically recording and reporting network performance by the plurality of network nodes.

* * * * *